(12) United States Patent
Onoue

(10) Patent No.: US 10,904,110 B2
(45) Date of Patent: Jan. 26, 2021

(54) MANAGEMENT METHOD OF MATCHING SERVICE AND INFORMATION PROCESSING APPARATUS

(71) Applicant: FUJITSU LIMITED, Kawasaki (JP)

(72) Inventor: Koichi Onoue, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 46 days.

(21) Appl. No.: 16/258,742

(22) Filed: Jan. 28, 2019

(65) Prior Publication Data
US 2019/0253327 A1 Aug. 15, 2019

(30) Foreign Application Priority Data
Feb. 9, 2018 (JP) ................. 2018-021940

(51) Int. Cl.
*H04L 12/24* (2006.01)
*H04L 29/08* (2006.01)

(52) U.S. Cl.
CPC ...... *H04L 41/5067* (2013.01); *H04L 41/5032* (2013.01); *H04L 41/5064* (2013.01); *H04L 67/322* (2013.01)

(58) Field of Classification Search
CPC .... G06Q 30/0631; G06Q 50/01; G06Q 30/02; G06Q 30/0261; G06Q 30/0601; G06Q 30/0201; G06Q 30/0282; G06Q 30/0625; G06Q 30/0641; G06F 16/9535; G06F 16/24578; G06F 16/95; G06F 3/04842; G06F 16/951; G06F 16/3322; H04L 67/02; H04L 65/403; H04L 67/327; H04L 67/22; H04L 43/08; H04L 47/805; H04L 65/80; H04L 41/5067; H04L 12/24; H04L 29/08;
(Continued)

(56) References Cited

U.S. PATENT DOCUMENTS

| | | | |
|---|---|---|---|
| 8,171,032 B2* | 5/2012 | Herz | G06Q 30/02 707/748 |
| 8,588,110 B2* | 11/2013 | Raleigh | H04L 47/20 370/259 |

(Continued)

FOREIGN PATENT DOCUMENTS

| | | |
|---|---|---|
| JP | 2008-539512 | 11/2008 |
| JP | 2009-505234 | 2/2009 |
| WO | 2006/115911 | 11/2006 |

*Primary Examiner* — Sargon N Nano
(74) *Attorney, Agent, or Firm* — Fujitsu Patent Center

(57) ABSTRACT

An information processing apparatus includes a memory and a processor coupled to the memory. The processor is configured to accumulate, for each user, satisfaction information that represents whether users who make requests are satisfied with responses received from service providing functions to the requests, to the memory. The processor is configured to identify, for each user, a service providing function from which each user receives a response that has a degree of satisfaction that meets a predetermined condition among the service providing functions based on the satisfaction information accumulated in the memory. The processor is configured to determine, for each user, the identified service providing function as a preferential service providing function that is preferentially used at a time of generating a response to a request from each user.

11 Claims, 29 Drawing Sheets

(58) Field of Classification Search
CPC .............. H04L 41/5064; H04L 67/322; H04N 21/4826; H04W 4/029
See application file for complete search history.

(56) References Cited

U.S. PATENT DOCUMENTS

| | | | | |
|---|---|---|---|---|
| 8,751,427 | B1* | 6/2014 | Mysen | H04L 67/306 |
| | | | | 706/46 |
| 9,904,579 | B2* | 2/2018 | Shear | G06F 9/50 |
| 10,168,167 | B2* | 1/2019 | Rakah | G01C 21/3438 |
| 10,515,394 | B2* | 12/2019 | Nicholas | G06Q 30/0255 |
| 2001/0039211 | A1* | 11/2001 | Yoshizawa | G07F 17/32 |
| | | | | 463/42 |
| 2002/0082988 | A1* | 6/2002 | Ujiie | G06Q 30/02 |
| | | | | 705/39 |
| 2002/0103692 | A1* | 8/2002 | Rosenberg | G06Q 30/0601 |
| | | | | 705/7.29 |
| 2007/0039018 | A1 | 2/2007 | Saslow et al. | |
| 2009/0276279 | A1* | 11/2009 | Quesnel | G06Q 30/0203 |
| | | | | 705/7.29 |
| 2010/0114682 | A1* | 5/2010 | Bosco | G06Q 30/02 |
| | | | | 705/14.6 |
| 2013/0204676 | A1* | 8/2013 | Hindi | G06Q 50/30 |
| | | | | 705/13 |
| 2013/0282519 | A1* | 10/2013 | Xavier | G06Q 30/00 |
| | | | | 705/26.7 |
| 2013/0290234 | A1* | 10/2013 | Harris | G06N 5/022 |
| | | | | 706/46 |
| 2014/0236953 | A1* | 8/2014 | Rapaport | G06F 16/285 |
| | | | | 707/740 |
| 2016/0012492 | A1* | 1/2016 | LaJoie | H04N 21/812 |
| | | | | 705/14.66 |
| 2016/0350674 | A1* | 12/2016 | Midboe | H04L 67/327 |
| 2017/0324758 | A1* | 11/2017 | Hart | H04L 63/1416 |

* cited by examiner

| ITEM NUMBER | REDETERMINATION TYPE | REDETERMINATION TIMING | PROCESSING METHOD | MAIN ENGINE IDENTIFICATION INFORMATION | REQUEST TRANSMISSION FREQUENCY |
|---|---|---|---|---|---|
| 1 | REQUEST NUMBER | 1000 | SWITCHING TRANSMISSION | 2a | 0.5 |

| ITEM NUMBER | USER IDENTIFICATION INFORMATION | MAIN ENGINE IDENTIFICATION INFORMATION |
|---|---|---|
| 1 | 3a | 2a |
| 2 | 3b | 2c |
| 3 | 3c | 2a |

FIG. 23A

| ITEM NUMBER | USER IDENTIFICATION INFORMATION | ENGINE IDENTIFICATION INFORMATION | ADOPTION AVAILABILITY |
|---|---|---|---|
| 1 | 3a | 2a | TRUE |

| ITEM NUMBER | USER IDENTIFICATION NUMBER | ENGINE IDENTIFICATION INFORMATION | ADOPTION NUMBER | RECEPTION NUMBER |
|---|---|---|---|---|
| 1 | 3a | 2a | 8 | 20 |
| 2 | 3a | 2b | 3 | 10 |
| 3 | 3a | 2c | 2 | 10 |
| 4 | 3b | 2a | 5 | 15 |
| 5 | 3b | 2b | 9 | 15 |
| 6 | 3b | 2c | 11 | 30 |
| ... | ... | ... | ... | ... |

332

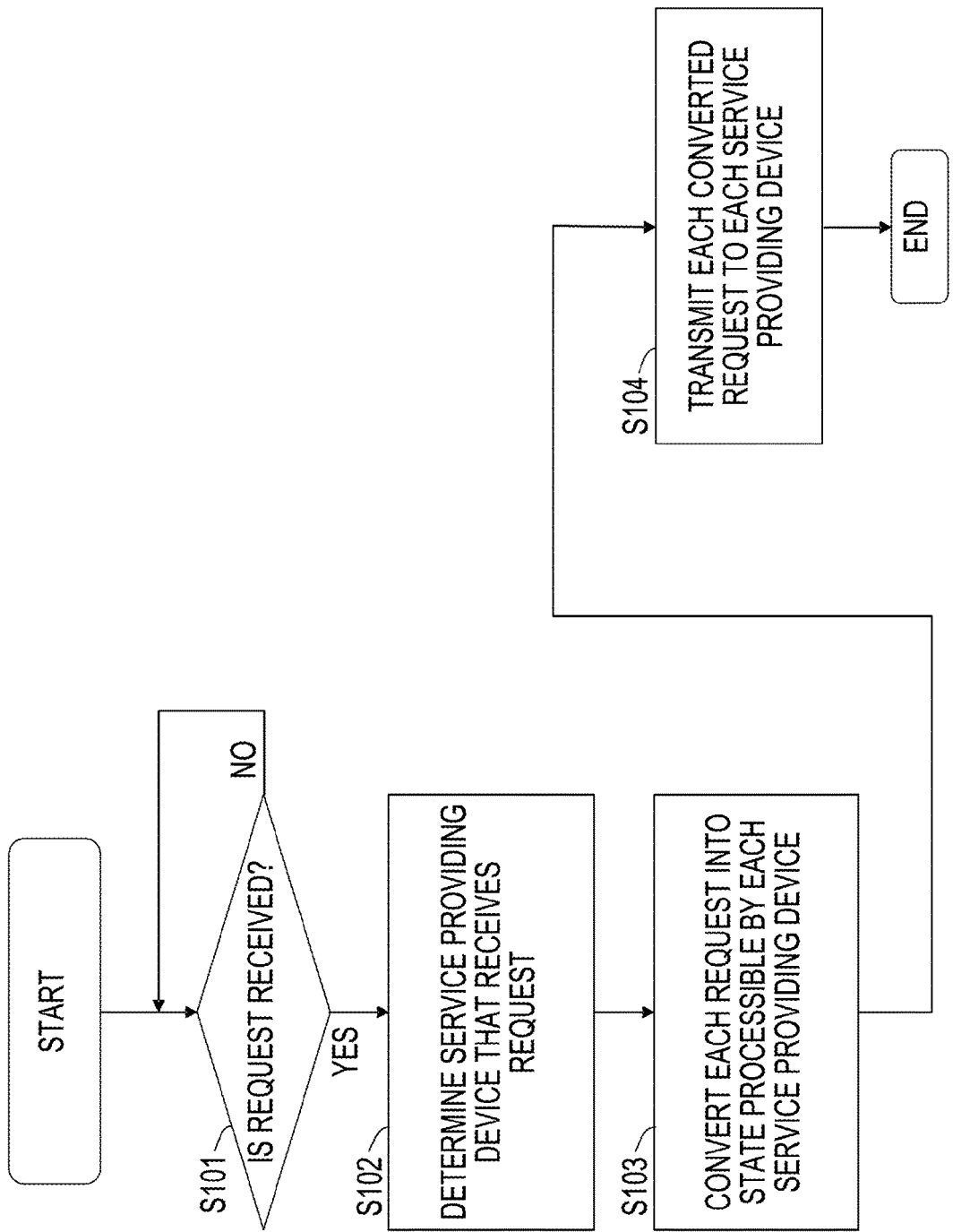

FIG. 28A

| ITEM NUMBER | REDETERMINATION TYPE | REDETERMINATION TIMING | PROCESSING METHOD | MAIN ENGINE IDENTIFICATION INFORMATION | REQUEST TRANSMISSION FREQUENCY |
|---|---|---|---|---|---|
| 1 | REQUEST NUMBER | 1000 | DISTRIBUTION TRANSMISSION | 2a | 0.5 |

| ITEM NUMBER | USER IDENTIFICATION INFORMATION | MAIN ENGINE IDENTIFICATION INFORMATION |
|---|---|---|
| 1 | 3a | 2a |
| 2 | 3b | 2c |
| 3 | 3c | 2a |

132

MANAGEMENT METHOD OF MATCHING SERVICE AND INFORMATION PROCESSING APPARATUS

CROSS-REFERENCE TO RELATED APPLICATION

This application is based upon and claims the benefit of priority of the prior Japanese Patent Application No. 2018-021940, filed on Feb. 9, 2018, the entire contents of which are incorporated herein by reference.

FIELD

The embodiments discussed herein are related to a management method of a matching service and an information processing apparatus.

BACKGROUND

A service provider (hereinafter, also simply referred to as a business operator) that provides various services to a user provides, for example, a service (also referred to as matching service) that outputs information corresponding to a request from the user.

When there is a request from the user, the matching service presents information corresponding to a condition included in the request to the user. In addition, when the presented information includes information which suits a taste of the user, the user determines to adopt the information. Specifically, the matching service includes, for example, presenting information that indicates the accommodation facilities matching a condition for accommodation facilities to the user, when such a condition is input from the user.

In the case of newly starting the provision of the matching service as described above, the service provider constructs, for example, a business system required for providing the matching service by using a function that is already developed in another matching service. Hereinafter, a function that is already developed in another matching service may also be referred to simply as a function. As a result, the service provider may shorten a development time required to start providing a new matching service.

Related techniques are disclosed in, for example, Japanese National Publication of International Patent Application No. 2008-539512 and Japanese National Publication of International Patent Application No. 2009-505234.

SUMMARY

According to an aspect of the present invention, provided is an information processing apparatus including a memory and a processor coupled to the memory. The processor is configured to accumulate, for each user, satisfaction information that represents whether users who make requests are satisfied with responses received from service providing functions to the requests, to the memory. The processor is configured to identify, for each user, a service providing function from which each user receives a response that has a degree of satisfaction that meets a predetermined condition among the service providing functions based on the satisfaction information accumulated in the memory. The processor is configured to determine, for each user, the identified service providing function as a preferential service providing function that is preferentially used at a time of generating a response to a request from each user.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIGS. 22A and 22B are diagrams for describing specific examples of setting information 131 and distribution information 132;

FIGS. 23A and 23B are diagrams for describing a specific example of satisfaction information 331;

FIG. 24 is a flowchart for describing details of a management process in the case of performing a distribution transmission process;

FIGS. 28A and 28B are diagrams for describing specific examples of setting information 131 and distribution information 132.

DESCRIPTION OF EMBODIMENTS

When a user's hobby preference varies with the lapse of time, the matching service may not efficiently provide information with a high probability of being satisfied by the user, so that the employment probability (hereinafter also referred to as matching establishment rate) of the information presented to the user may gradually deteriorate. Therefore, the service provider changes the functions used in the matching service to other functions as necessary. As a result, the service provider may attempt to recover a matching establishment rate which has deteriorated.

However, when the function used in the matching service is frequently changed, development cost (maintenance cost) of a business system becomes extensive. As a result, the service provider may maintain the matching establishment rate at a high level while suppressing the frequency of a functional change.

[Configuration of Information Processing System]

Figure 1:
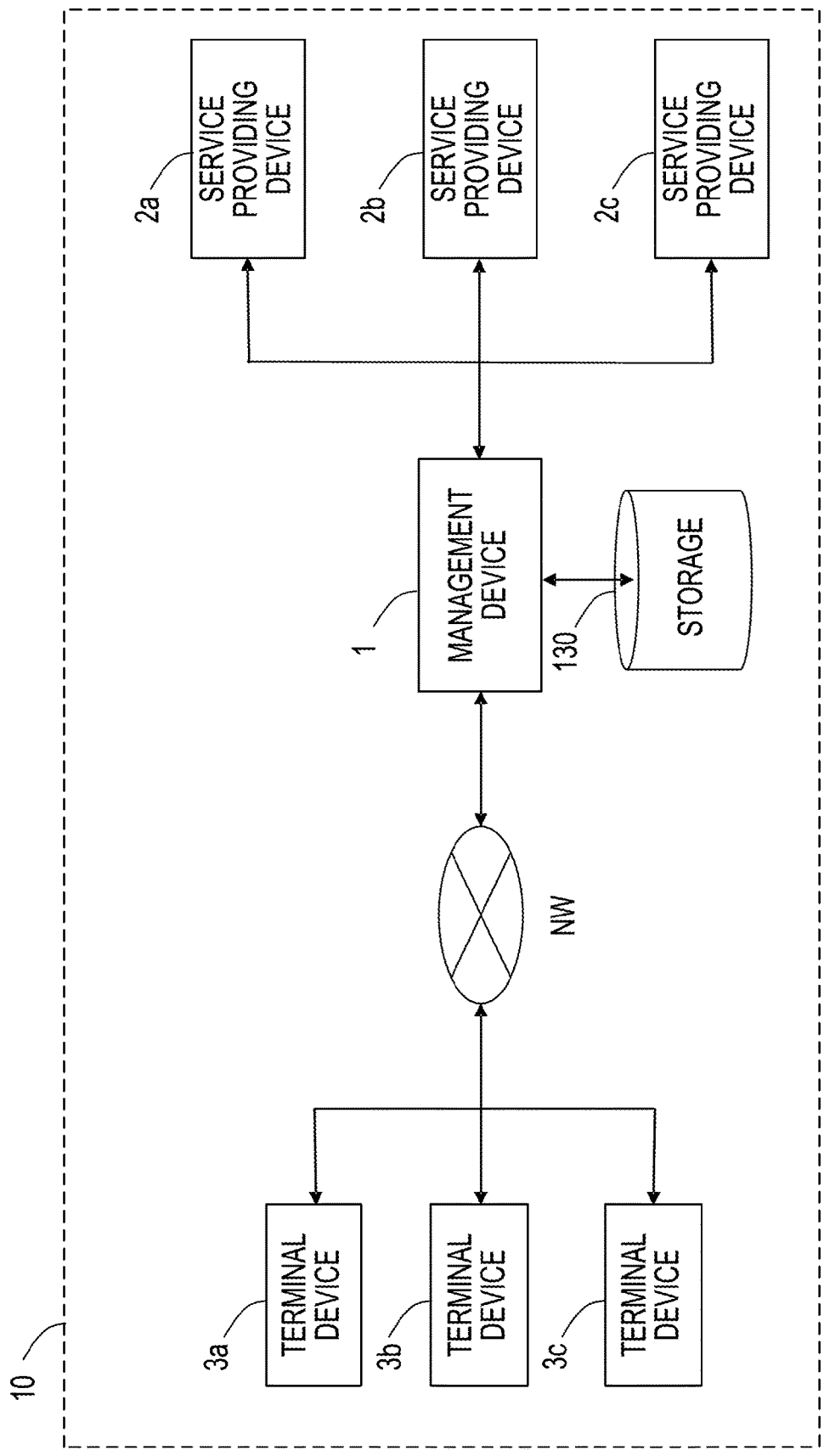
FIG. 1 is a diagram illustrating a configuration of an information processing system 10.

FIG. 1 is a diagram illustrating a configuration of an information processing system 10. The information processing system 10 illustrated in FIG. 1 is a business system that provides a matching service and includes a management device 1, service providing devices 2a, 2b, and 2c (hereinafter, also collectively referred to as a service providing device 2), terminal devices 3a, 3b, and 3c (hereinafter, also referred to as a terminal device 3) connected with the management device 1 through a network NW, and a storage 130 installed inside or outside the management device 1. Hereinafter, it is assumed that the terminal devices 3a, 3b, and 3c are used by different users, respectively.

The management device 1 is constituted by one or more physical machines and executes a process that provides the matching service to a user. Specifically, for example, when the user inputs a condition for an accommodation facility through the terminal device 3, the management device 1 identifies the service providing device 2 corresponding to the input condition by referring to various information stored in the storage 130. In addition, the management device 1 transmits the condition to a specific service providing device 2.

Each service providing device 2 is constituted by one or more physical machines and has a function (hereinafter also referred to as a service providing function) of identifying information which meets the condition transmitted from the management device 1. Specifically, when the service providing device 2 receives the condition for the accommodation facility from the management device 1, the service providing device 2 identifies one or more accommodation facilities which meet the received condition. In addition, the service providing device 2 transmits information that indicates one or more specific accommodation facilities to the management device 1.

Thereafter, when the management device 1 receives information which meets the condition from the service providing device 2, the management device 1 transmits the received information to the terminal device 3 into which the user inputs the condition.

Here, for example, when a hobby and a preference of the user are changed with the lapse of time, the information processing system 10 described above may not efficiently provide information having a high probability of being satisfied by the user, and as a result, a matching establishment rate may gradually deteriorate.

Therefore, the service provider changes, for example, the functions used in the service providing device 2 to other functions as necessary. As a result, the service provider may attempt to recover a matching establishment rate which has deteriorated.

However, when the function used in the service providing device 2 is frequently changed, development cost (maintenance cost) of a business system becomes extensive. As a result, the service provider may maintain the matching establishment rate at a high level while suppressing a frequency of a functional change as much as possible.

Therefore, the management device 1 in the embodiment accumulates information (hereinafter also referred to as satisfaction information) representing whether a user who has made a request is satisfied with a response to the request in the storage 130. In addition, based on the accumulated satisfaction information, the management device 1 determines, for each user, among a plurality of service providing devices 2 that generates the response to the request, a service providing device 2 in which a degree of satisfaction of the response generated for the request meets a predetermined condition as a priority service providing device 2 which is preferentially used at the time of generating the response to the request from each user.

That is, the management device 1 acquires and accumulates, for example, satisfaction information that represents whether the user who has received the response to the request adopts the information whenever the request is generated. In addition, the management device 1 identifies the service providing device 2 which may generate a response having a high degree of satisfaction of the user for each user by referring to the satisfaction information.

As a result, the management device 1 may preferentially transmit the request to the service providing device 2 which may increase the matching establishment rate for each user. As a result, the management device 1 may maintain the matching establishment rate at the high level while suppressing the frequency of the functional change.

[Hardware Configuration of Information Processing System]

Figure 2:
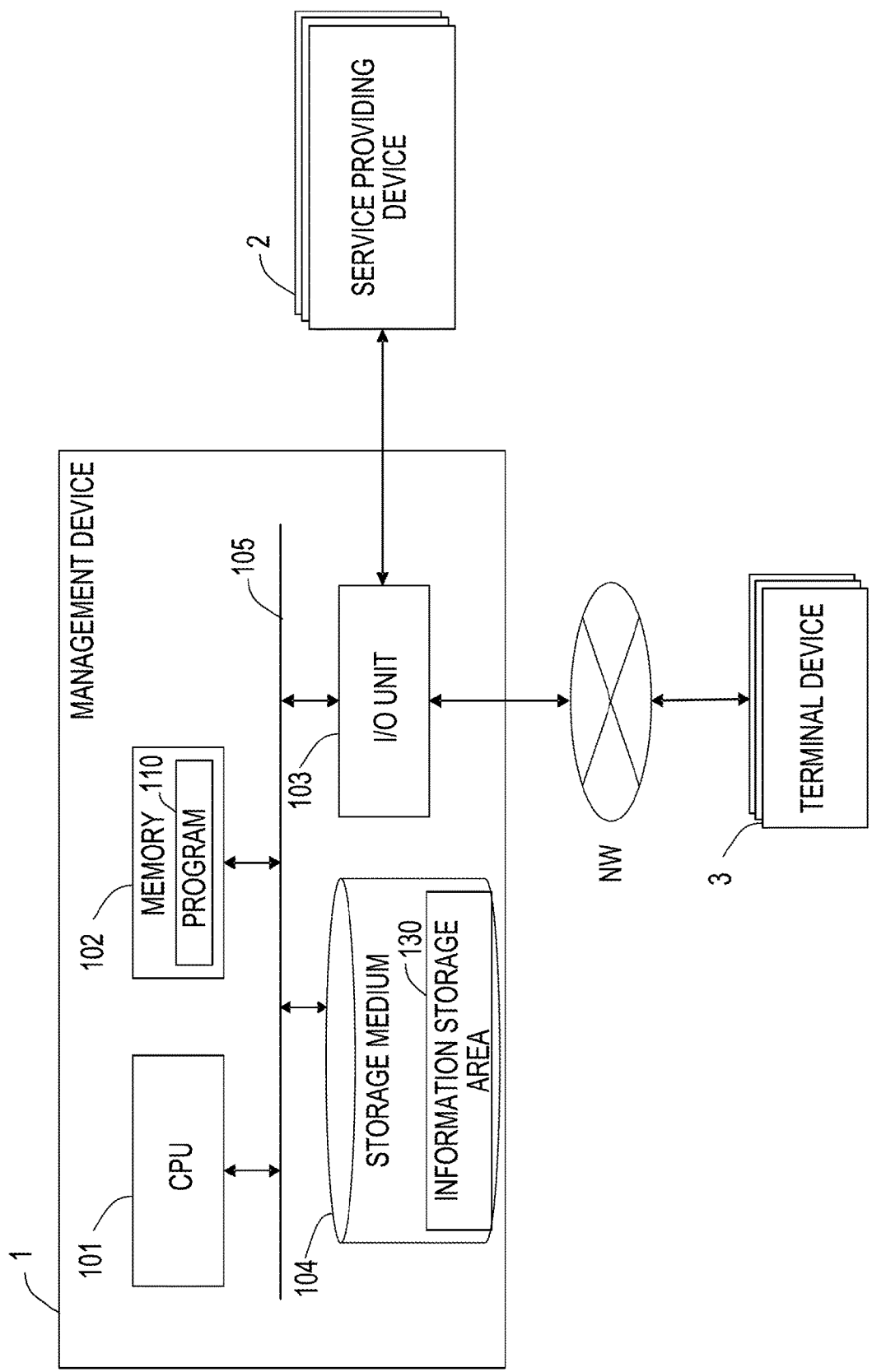
FIG. 2 is a diagram illustrating a hardware configuration of a management device 1.
Figure 3:
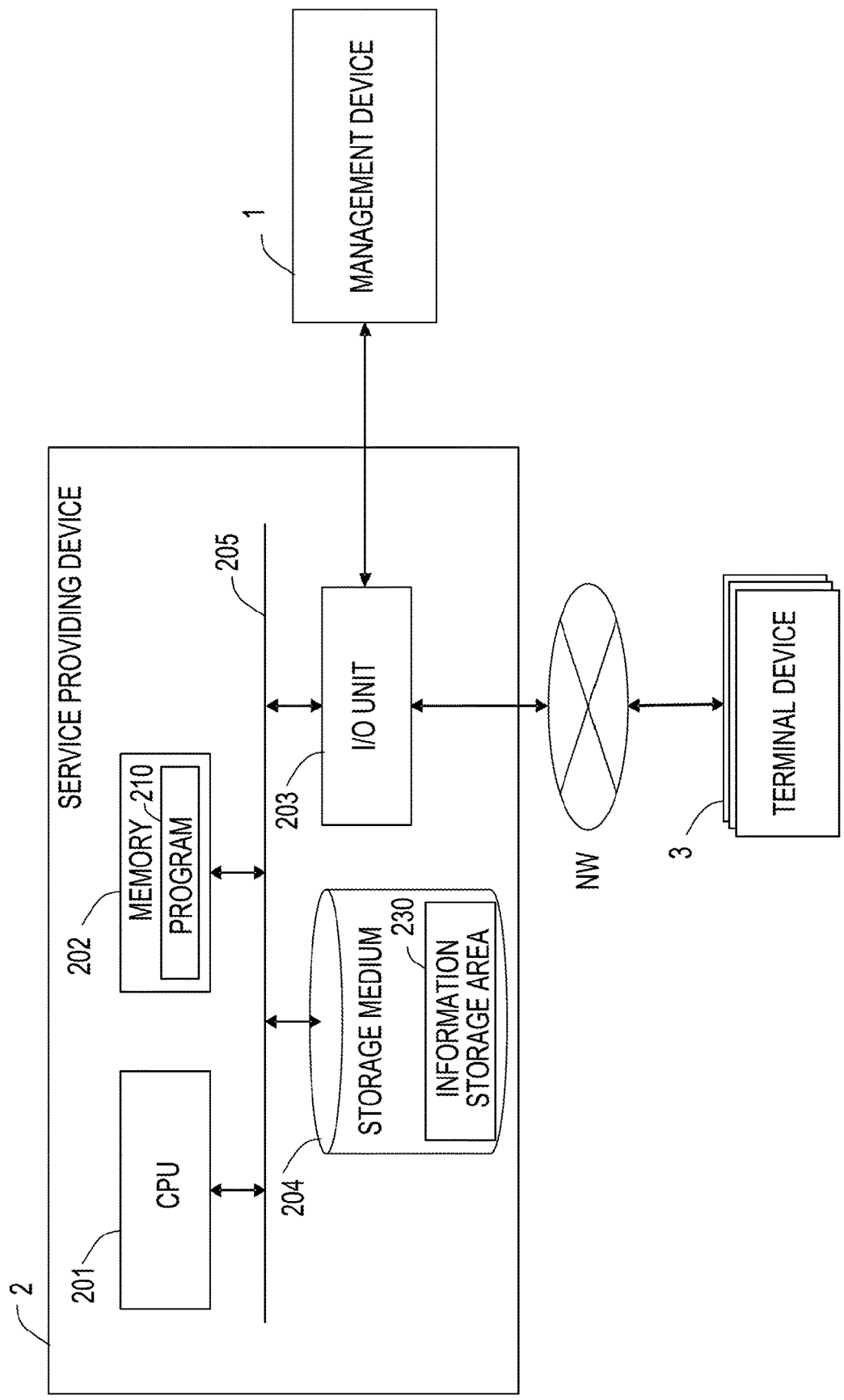
FIG. 3 is a diagram illustrating a hardware configuration of a service providing device 2.
Figure 4:
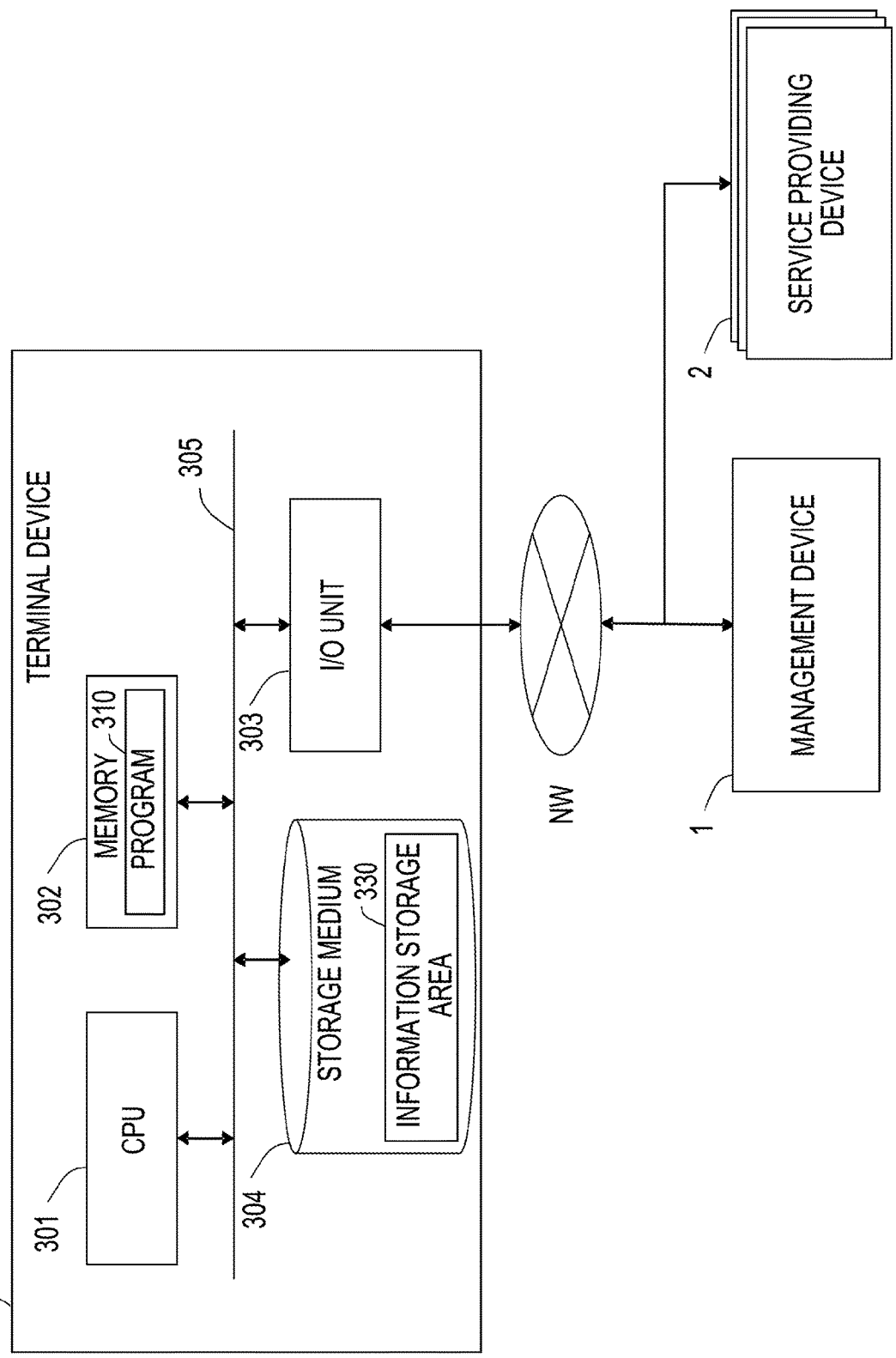
FIG. 4 is a diagram illustrating a hardware configuration of a terminal device 3.

Next, descriptions will be made on the hardware configuration of the information processing system 10. FIG. 2 is a diagram illustrating a hardware configuration of a management device 1. Further, FIG. 3 is a diagram illustrating a hardware configuration of a service providing device 2. Moreover, FIG. 4 is a diagram illustrating a hardware configuration of a terminal device 3.

As illustrated in FIG. 2, the management device 1 includes a CPU 101 which is a processor, a memory 102, an external interface 103 (hereinafter, also referred to as an I/O unit 103), and a storage medium 104. Respective units are connected to each other through a bus 105.

The storage medium 104 stores a program 110 for performing a process (hereinafter also referred to as a management process) that performs a generation of the response to the request in a program storage area (not illustrated), for example, in the storage medium 104. The storage medium 104 may be, for example, a hard disk drive (HDD).

The storage medium 104 has, for example, a storage 130 (hereinafter also referred to as an information storage area 130) that stores information used for the management process.

The CPU 101 performs the management process by executing the program 110 loaded from the storage medium 104 to the memory 102.

The external interface 103 communicates with, for example, the service providing device 2 or the terminal device 3.

As illustrated in FIG. 3, the service providing device 2 includes a CPU 201 which is the processor, a memory 202, an external interface 203 (hereinafter, also referred to as an I/O unit 203), and a storage medium 204. Respective units are connected to each other through a bus 205.

The storage medium 204 stores a program 210 that performs a management process, for example, in a program storage area (not illustrated) in the storage medium 204. The storage medium 204 may be, for example, the hard disk drive (HDD).

The storage medium 204 includes, for example, a storage 230 (hereinafter also referred to as an information storage area 230) that stores information used for the management process.

The CPU 201 performs the management process by executing a program 210 loaded to the memory 202 from the storage medium 204.

The external interface 203 communicates with, for example, the management device 1 or the terminal device 3.

Moreover, as illustrated in FIG. 4, the terminal device 3 includes a CPU 301 which is the processor, a memory 302, an external interface 303 (hereinafter, also referred to as an I/O unit 303), and a storage medium 304. Respective units are connected to each other through a bus 305.

The storage medium 304 stores a program 310 that performs a management process, for example, in a program storage area (not illustrated) in the storage medium 304. The storage medium 304 may be, for example, the hard disk drive (HDD).

The storage medium 304 includes, for example, a storage 330 (hereinafter also referred to as an information storage area 330) that stores information used for the management process.

The CPU 301 performs the management process by executing a program 310 loaded to the memory 304 from the storage medium 302.

The external interface 303 communicates with, for example, the service providing device 2 or the terminal device 3.

[Function of Information Processing System]

Figure 5:
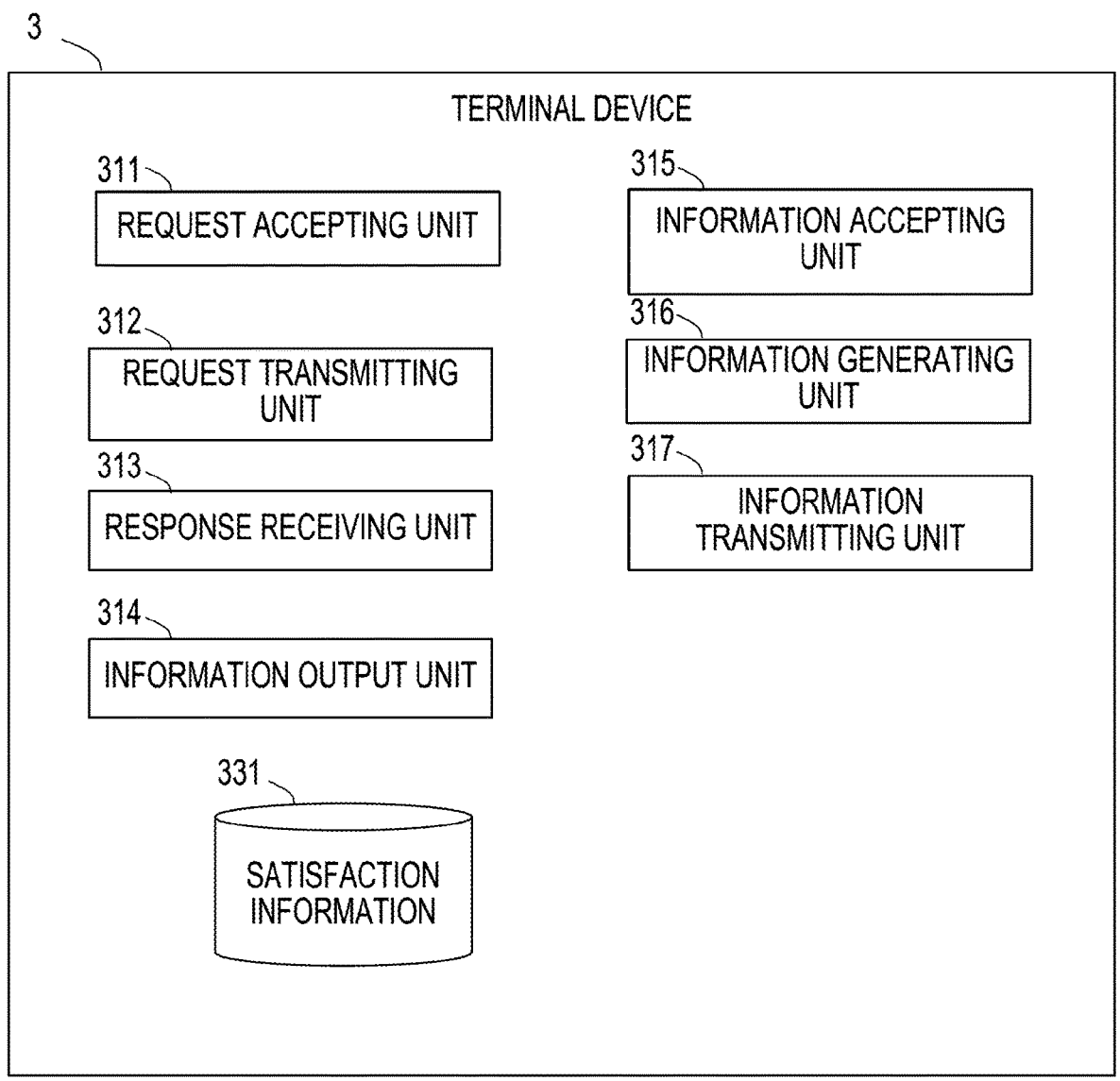
FIG. 5 is a functional block diagram of a terminal device 3.
Figure 6:
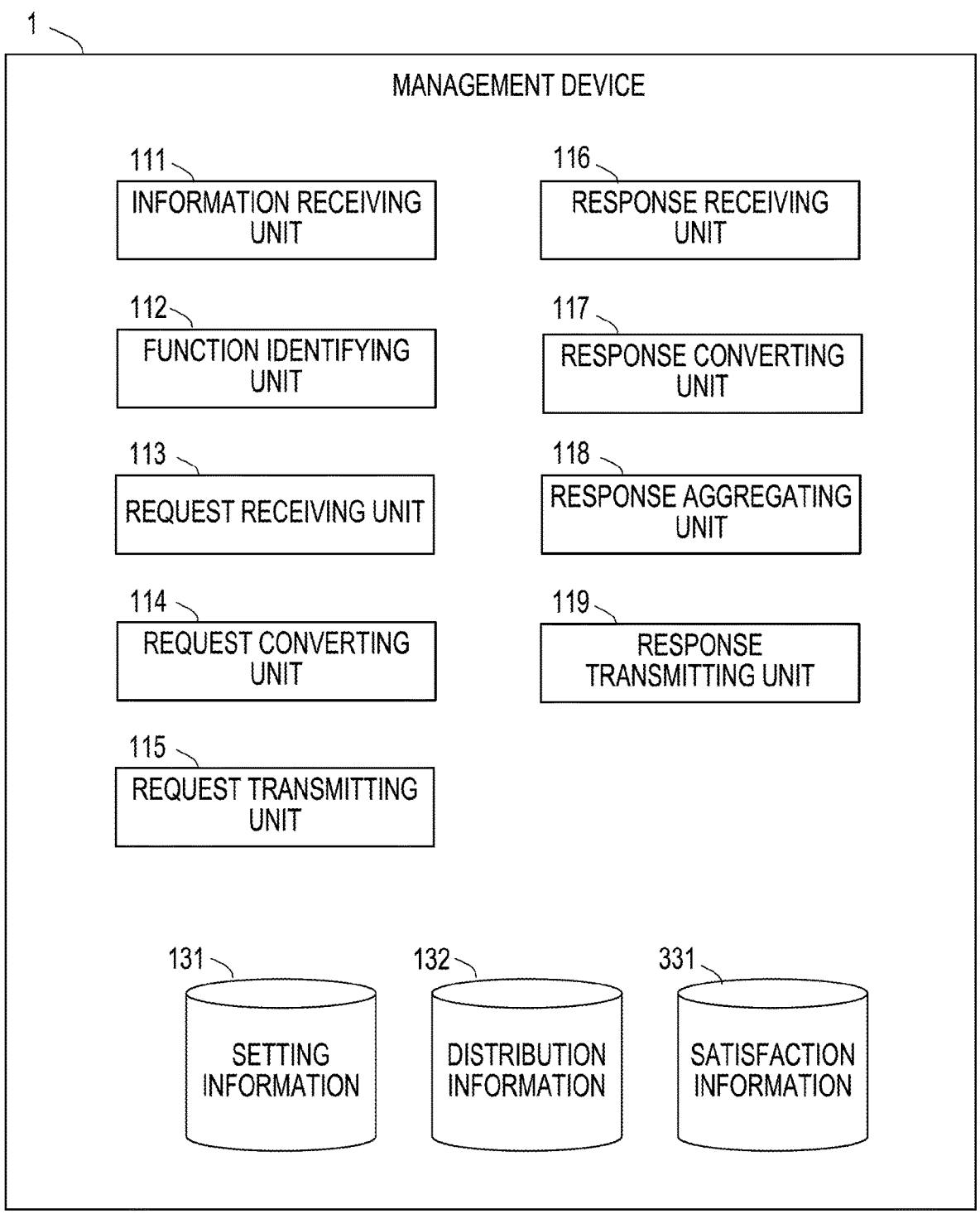
FIG. 6 is a functional block diagram of the management device 1.
Figure 7:
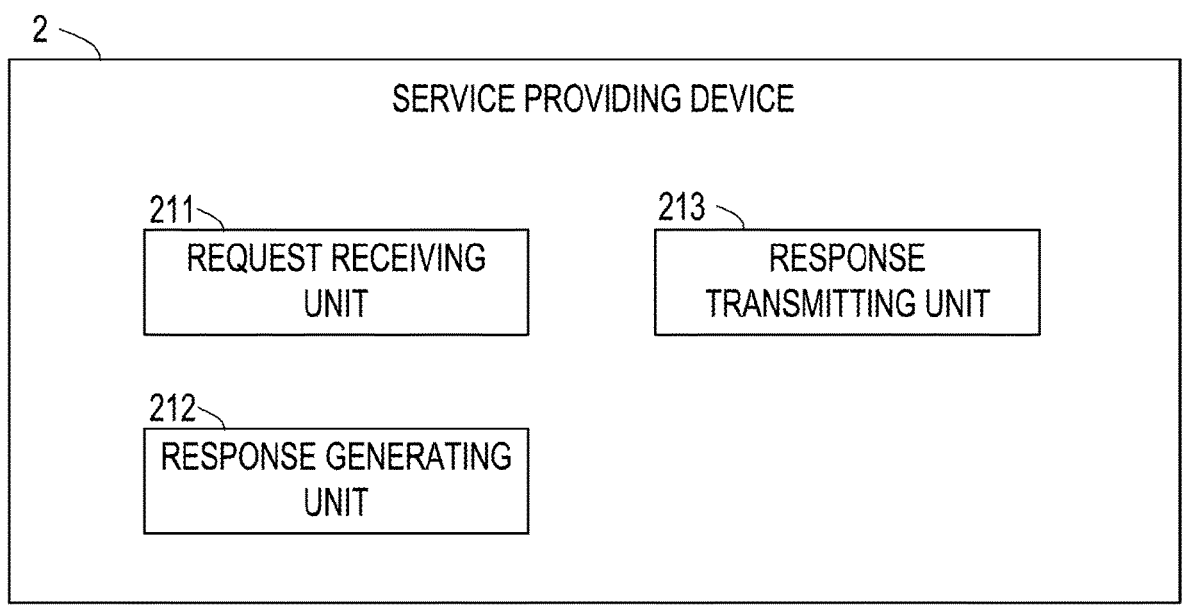
FIG. 7 is a functional block diagram of the service providing device 2.

Next, descriptions will be made on the function of the information processing system 10. FIG. 5 is a functional block diagram of a terminal device 3. Further, FIG. 6 is a functional block diagram of a management device 1. Moreover, FIG. 7 is a functional block diagram of a service providing device 2.

First, the functional block diagram of the terminal device 3 will be described.

In the terminal device 3, hardware such as the CPU 301 or the memory 302 and the program 310 organically cooperate with each other, and as a result, the terminal device 3 implements various functions including a request accepting unit 311, a request transmitting unit 312, a response receiving unit 313, an information output unit 314, an information accepting unit 315, an information generating unit 316, and an information transmitting unit 317 as illustrated in FIG. 5. Further, the terminal device 3 stores satisfaction information 331 in an information storage area 330 as illustrated in FIG. 5.

The request accepting unit 311 receives a request which a user inputs into the terminal device 3 through an input device (not illustrated) such as a keyboard.

The request transmitting unit 312 transmits the request received by the request accepting unit 311 to the management device 1.

The response receiving unit 313 receives a response (response to the request) transmitted by the management device 1.

The information output unit 314 outputs information included in the response received by the response receiving unit 313 to an output device (not illustrated) such as a monitor, etc.

The information accepting unit 315 accepts information indicating adoption of the information output by the information output unit 314.

The information generating unit 316 associates information included in the response received by the response receiving unit 313 and information accepted by the information accepting unit 315 to generate the satisfaction information 331 representing whether the user is satisfied with response contents to the request. Thereafter, the information generating unit 316 stores the generated satisfaction information 331 in the information storage area 330. A specific example of the satisfaction information 331 will be described below.

The information transmitting unit 317 transmits the satisfaction information 331 generated by the information generating unit 316 to the management device 1. Specifically, the information transmitting unit 317 transmits the generated satisfaction information 331 to the management device 1 whenever the information generating unit 316 generates the satisfaction information 331, for example.

Next, descriptions will be made on the functional block diagram of the management device 1.

In the management device 1, the hardware such as the CPU 101 or the memory 102 and the program 110 organically cooperate with each other, and as a result, the management device 1 implements various functions including an information receiving unit 111, a function identifying unit 112, a request receiving unit 113, a request converting unit 114, a request transmitting unit 115, a response receiving unit 116, a response converting unit 117, a response aggregating unit 118, and a response transmitting unit 119 as illustrated in FIG. 6. Further, the management device 1 stores setting information 131, distribution information 132, and the satisfaction information 331 (satisfaction information 331 transmitted from the terminal device 3) in the information storage area 130 as illustrated in FIG. 6.

The information receiving unit 111 receives the satisfaction information 331 transmitted by the terminal device 3. In addition, the information receiving unit 111 stores (accumulates) the received satisfaction information 331 in the information storage area 130.

Based on the satisfaction information 331 stored in the information storage area 130, the function identifying unit 112 calculates the degree of satisfaction of the user with respect to the response generated by each of the plurality of service providing devices 2 for each user. In addition, for each user, the function identifying unit 112 determines, for each user, the service providing device 2 in which the calculated degree of satisfaction meets a predetermined condition as a priority service providing device 2 that is preferentially used when generating the response to the request from each user.

Thereafter, the function identifying unit 112 generates the distribution information 132, which is information indicating the priority service providing device 2 identified for each user. In addition, the function identifying unit 112 stores the generated distribution information 132 in the information storage area 130. A specific example of the distribution information 132 will be described below.

The request receiving unit 113 receives the request transmitted by the terminal device 3 (request which the user inputs in the terminal device 3).

The request converting unit 114 identifies the service providing device 2 as a transmission destination of the request received by the request receiving unit 113 by referring to the setting information 131 and the distribution information 132 stored in the information storage area 130. The setting information 131 which is information referenced at the time of performing the management process is, for example, information stored in the information storage area 130 in advance by the service provider. In addition, the request converting unit 114 converts the information included in the request received by the request receiving unit 113 into a format which may be processed (recognized) by the service providing device 2 of the transmission destination. A specific example of the setting information 131 will be described below.

The request transmitting unit 115 transmits the request whose format is converted by the request converting unit 114 to the service providing device 2 of the transmission destination.

The response receiving unit 116 receives the response (to the request by the user) transmitted from the service providing device 2.

The response converting unit 117 converts (reconverts) the response received by the response receiving unit 116 into a format which may be processed (recognized) by the terminal device 3 which transmits the request.

When the response receiving unit 116 receives the responses from a plurality of service providing devices 2 as the request transmitting unit 115 transmits the requests to the plurality of service providing devices 2, the response aggregating unit 118 aggregates each of the responses reconverted by the response converting unit 117.

The response transmitting unit 119 transmits the response reconverted by the response converting unit 117 or the response aggregated by the response aggregating unit 118 to the terminal device 3.

The request receiving unit 113, the request converting unit 114, the request transmitting unit 115, the response receiving unit 116, the response converting unit 117, the response aggregating unit 118, and the response transmitting unit 119 may be functions implemented in a device (one or more other physical machines) different from the management device 1. In this case, the management device 1 may transmit the distribution information 132 generated by the function identifying unit 112 to another device.

Next, descriptions will be made on the functional block diagram of the service providing device 2.

As illustrated in FIG. 7, in the service providing device 2, the hardware such as the CPU 201 or the memory 220 and the program 210 organically cooperate with each other to implement various functions including the request receiving unit 211, the response generating unit 212, and the response transmitting unit 213.

The request receiving unit 211 receives the request transmitted from the management device 1.

The response generating unit 212 generates the response corresponding to the request received by the request receiving unit 211. Specifically, for example, when receiving the request for requesting information on an accommodation facility that meets the condition, the response generating unit 212 generates a response including the information on the accommodation facility that meets the condition.

The response transmitting unit 213 transmits the response generated by the response generating unit 212 to the management device 1.

Embodiment

Figure 8:
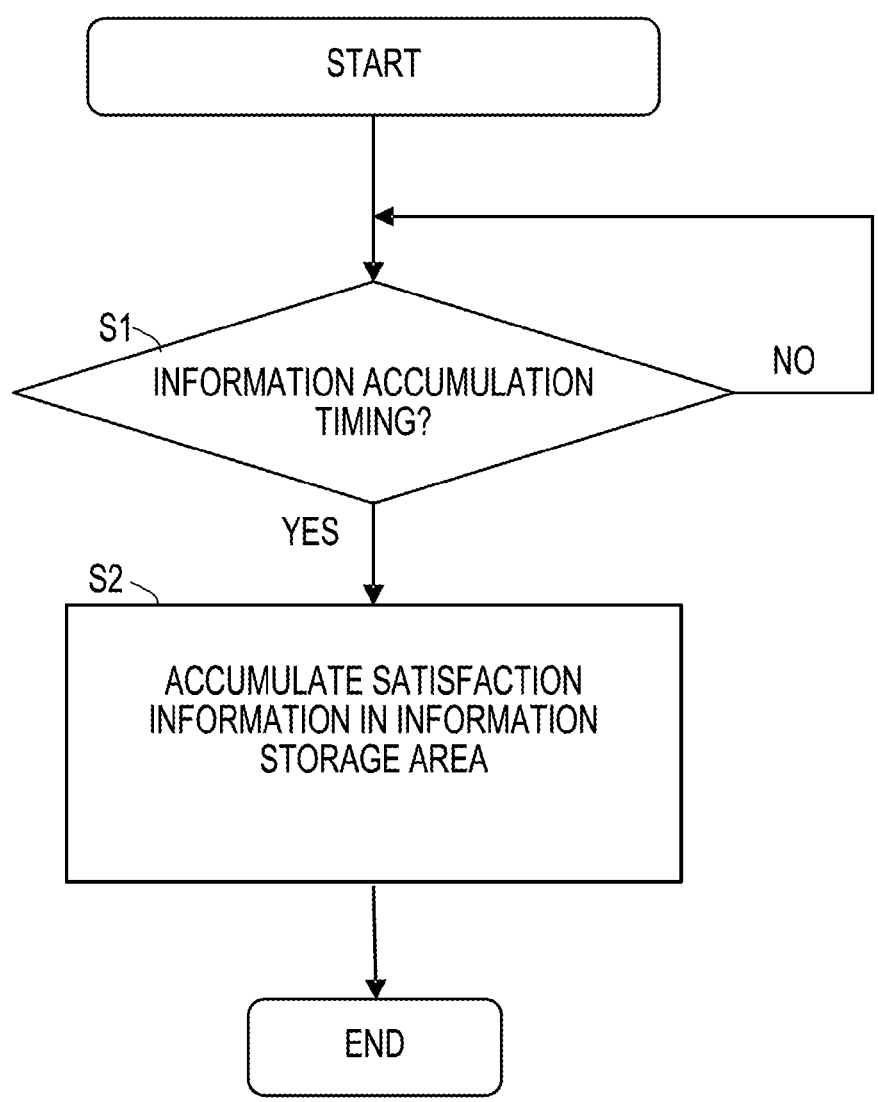
FIG. 8 is a flowchart for describing a management process in an embodiment.
Figure 9:
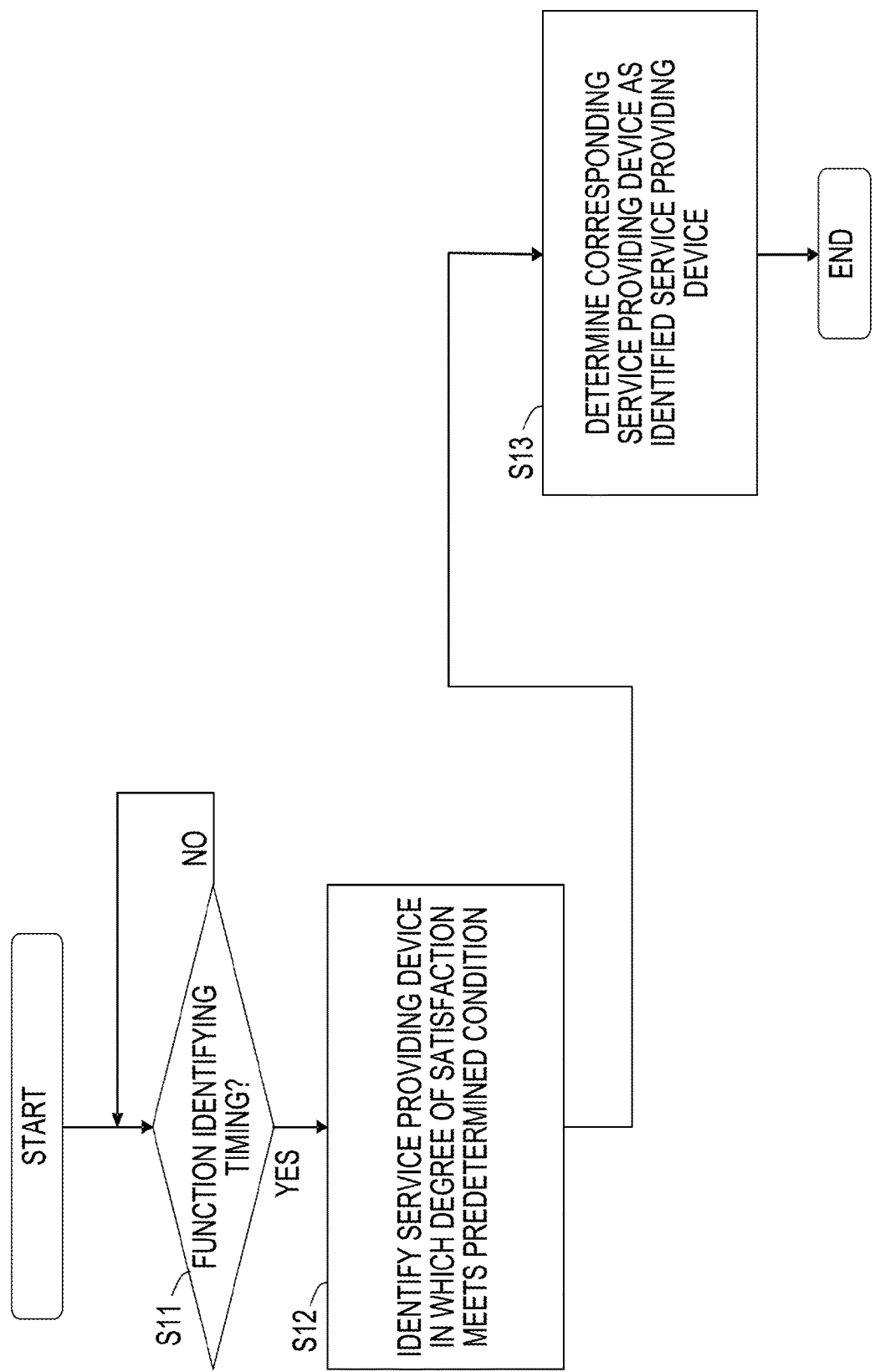
FIG. 9 is a flowchart for describing a management process in an embodiment.

Next, an embodiment will be described. FIGS. 8 and 9 are flowcharts for describing a management process in an embodiment. FIGS. 10 to 14 are diagrams for describing a management process in an embodiment. The details of the management process in FIGS. 8 and 9 will be described with reference to FIGS. 10 to 14.

As illustrated in FIG. 8, the management device 1 waits until an information accumulation timing comes ("NO" in S1). The information accumulation timing may be, for example, a timing at which the satisfaction information 331 is received from the terminal device 3.

Then, when the information accumulation timing comes ("YES" in S1), the management device 1 accumulates the satisfaction information 331 indicating whether the user making the request is satisfied with the response to the request in the information storage area 130 (S2). Specifically, for example, the management device 1 accumulates the satisfaction information 331 each time the management device 1 receives the satisfaction information 331 from the terminal device 3.

Further, as illustrated in FIG. 9, the management device 1 waits until a function identifying timing comes ("NO" in S11). The function identifying timing may be, for example, a timing which comes each time a request for each user is performed a predetermined number of times or a timing which comes each time a predetermined time elapses.

Then, when the function identifying timing comes ("YES" in S11), the management device 1 identifies a service providing device 2 in which the degree of satisfaction meets a predetermined condition among the plurality of service providing devices 2 that generates the response to the request for each user based on the satisfaction information 331 accumulated in the process of S2 (S12).

Figure 10:
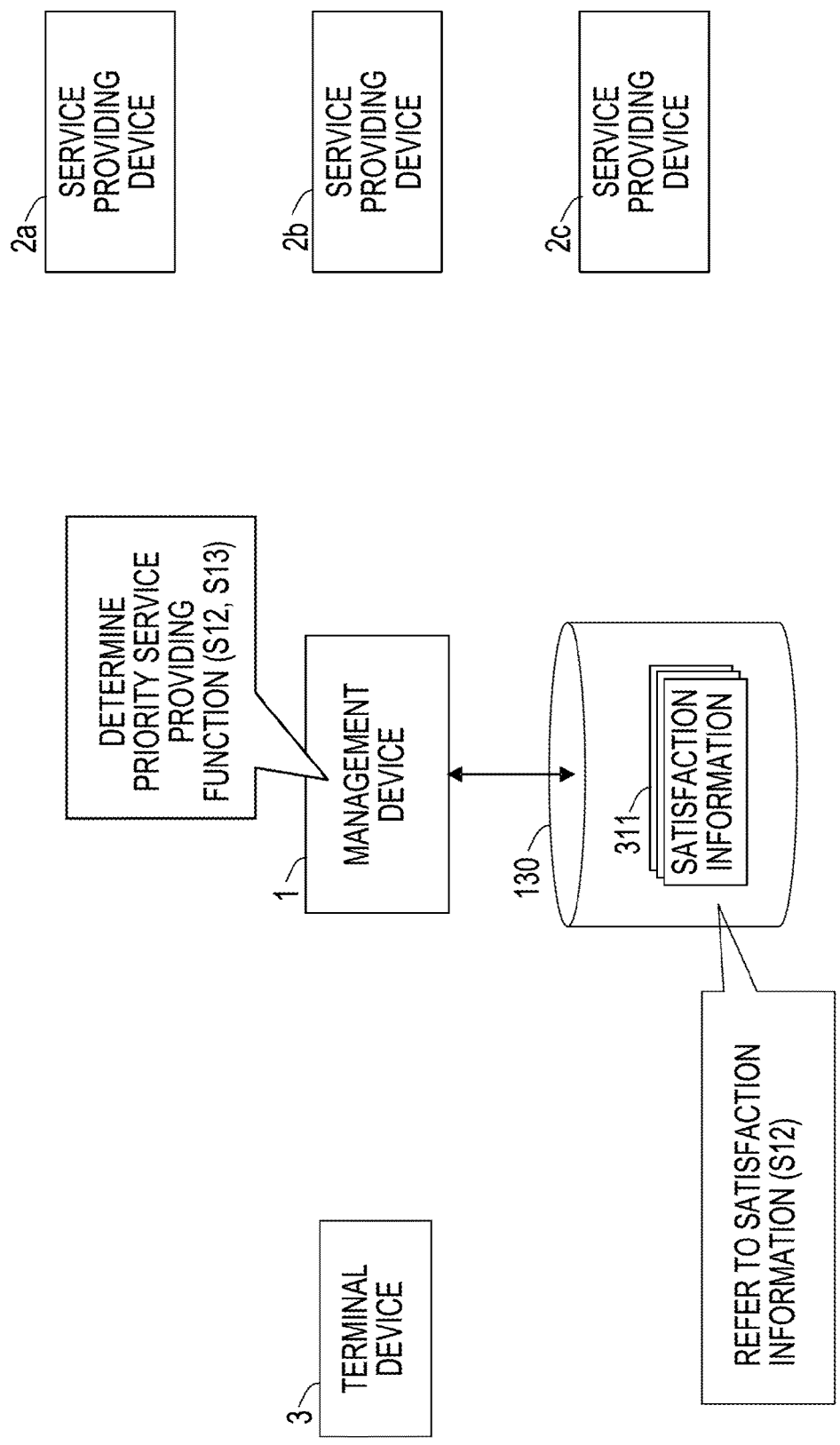
FIG. 10 is a diagram for describing a management process in an embodiment.

Subsequently, for each user, the management device 1 determines the service providing device 2 identified by the process of S12 as the priority service providing device 2 which is preferentially used when generating the response to the request from each user (S13). Specifically, as illustrated in FIG. 10, the management device 1 refers to the satisfaction information 331 stored in the information storage area 130 to determine the priority service providing device 2 preferentially used when generating the response to the request from each user.

As a result, the management device 1 may preferentially transmit the request to the service providing device 2 which may increase the matching establishment rate for each user. As a result, the management device 1 may maintain the matching establishment rate at the high level while suppressing the frequency of the functional change.

[Specific Example 1 in Case of Receiving Request from Terminal Device]

Next, descriptions will be made on a specific example of the case where the management device 1 receives the request from the terminal device 3 after the process of S13.

Figure 11:
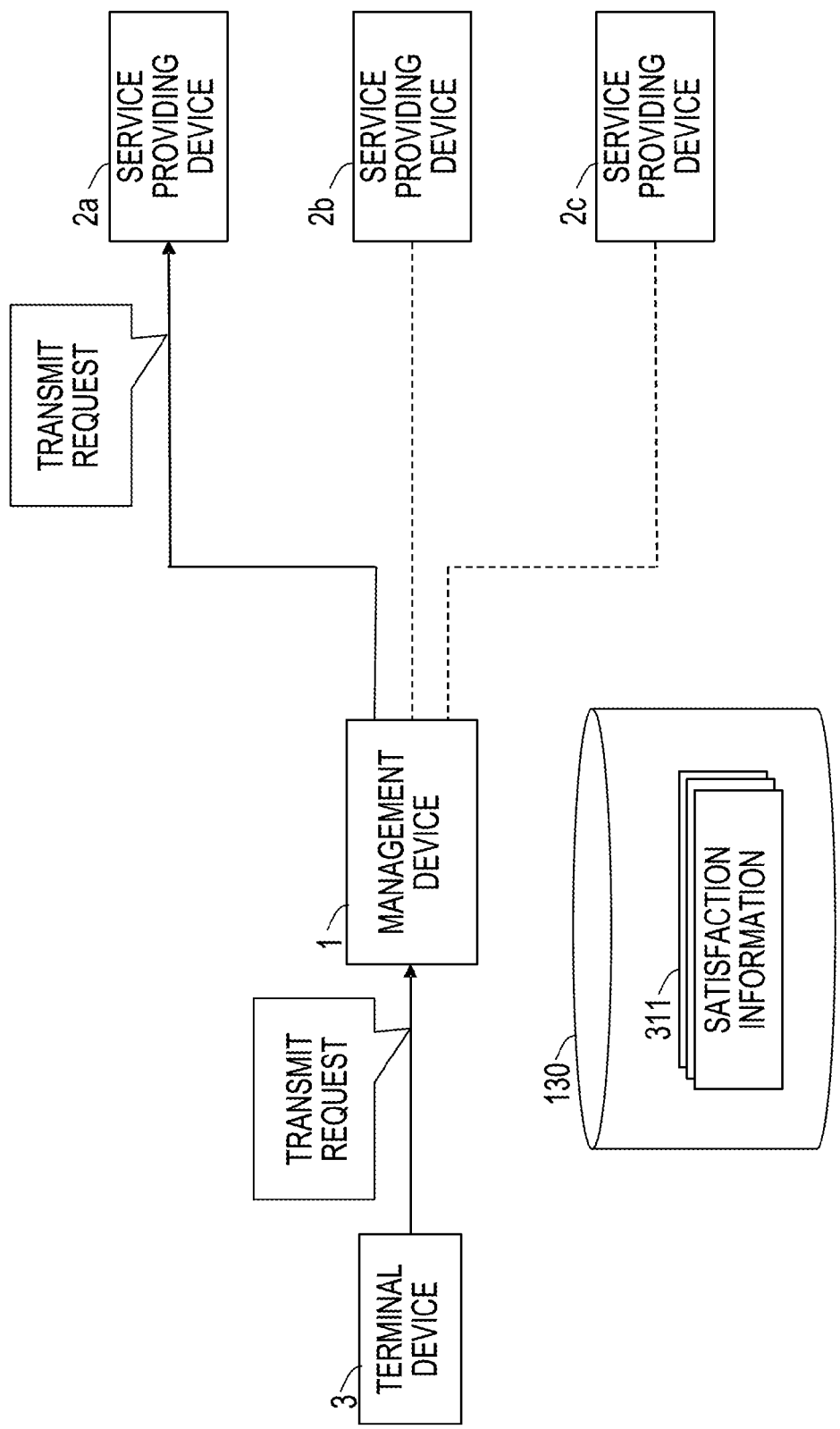
FIG. 11 is a diagram for describing a management process in an embodiment.

When the management device 1 receives the request from the terminal device 3 after the process of S13, the management device 1 transmits a request to any one service providing device 2, for example, so that a ratio of transmitting the request to the service providing device 2 identified by the process of S12 is higher than a ratio of transmitting the request to another service providing device 2. Specifically, for example, when a service providing device 2a is determined as the priority service providing device 2, the management device 1 transmits the request only to the service providing device 2a as illustrated in FIG. 11.

Figure 12:
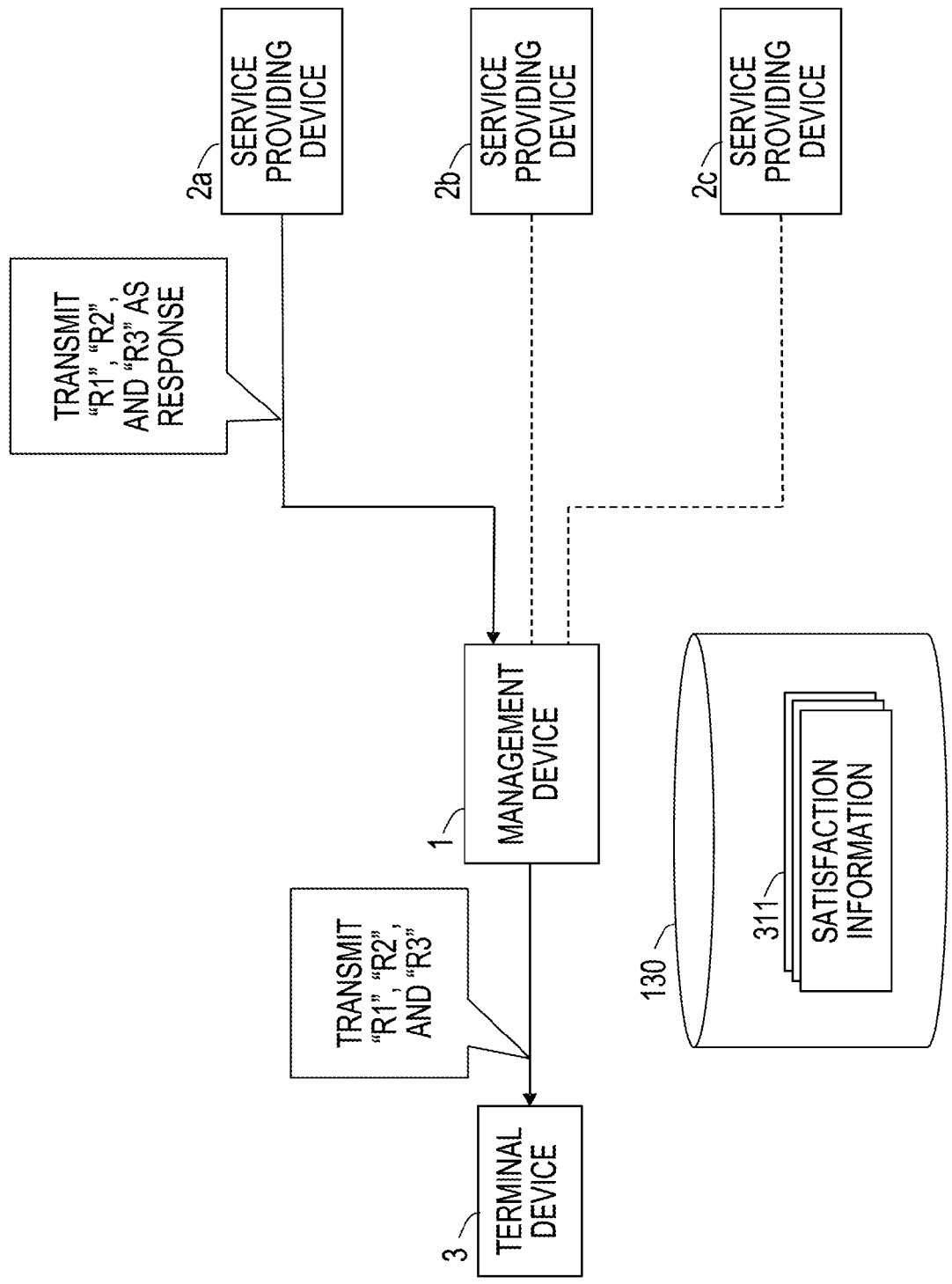
FIG. 12 is a diagram for describing a management process in an embodiment.

Thereafter, when the management device 1 receives the response from the service providing device 2 that transmits the request, the management device 1 transmits the received response to the terminal device 3 (the terminal device 3 which transmits the request to the management device 1). Specifically, for example, as illustrated in FIG. 12, when receiving a response including "R1", "R2", and "R3" from the service providing device 2a, the management device 1 transmits the received response to the terminal device 3 as it is.

[Specific Example 2 in Case of Receiving Request from Terminal Device]

Next, descriptions will be made on another specific example of the case where the management device 1 receives the request from the terminal device 3 after the process of S13.

Figure 13:
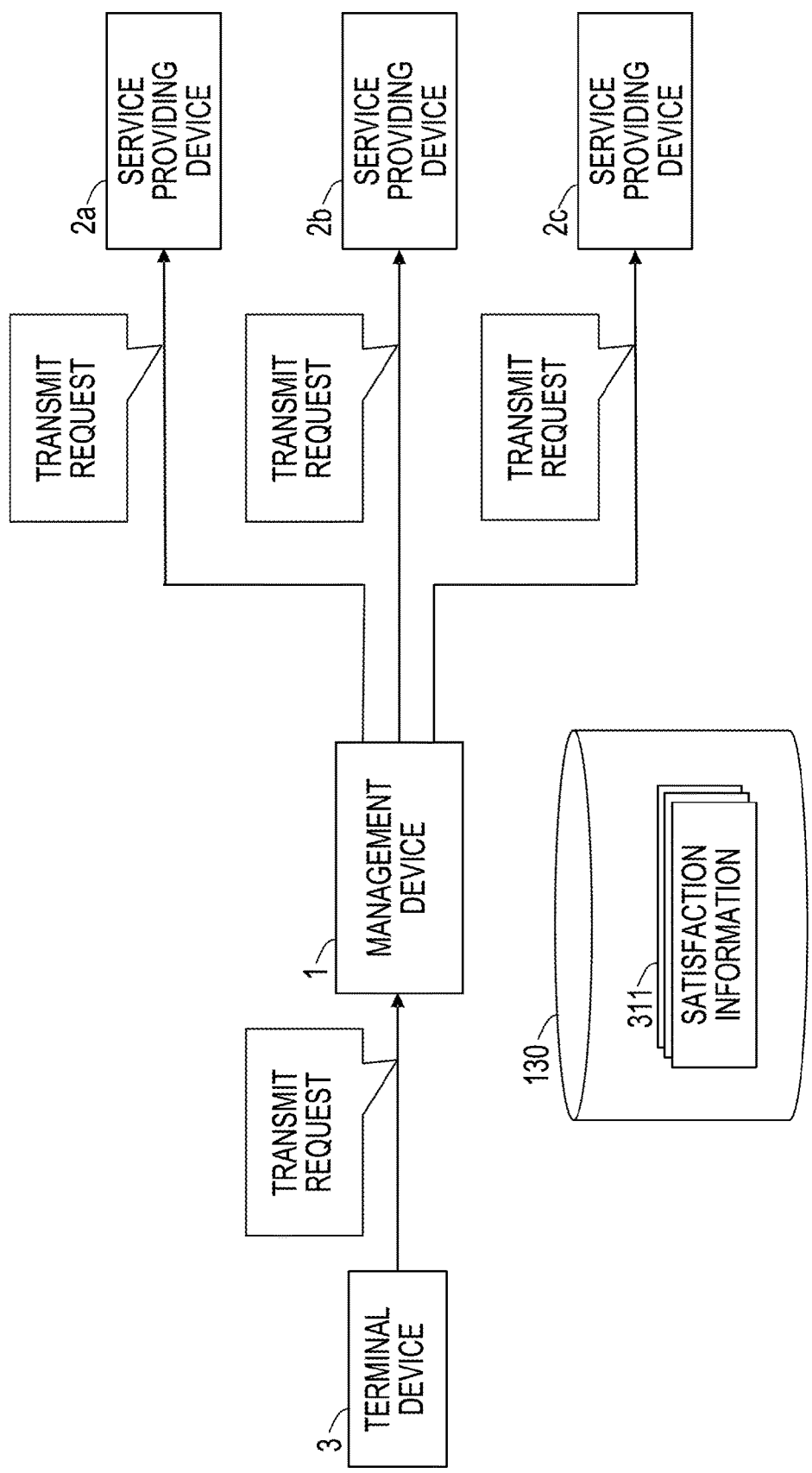
FIG. 13 is a diagram for describing a management process in an embodiment.

After the process of S13, when the management device 1 receives the request from the terminal device 3, the management device 1 transmits the received request to, for example, all service providing devices 2. Specifically, for example, as illustrated in FIG. 13, the management device 1 transmits the received request to each of the service providing devices 2a, 2b, and 2c.

Figure 14:
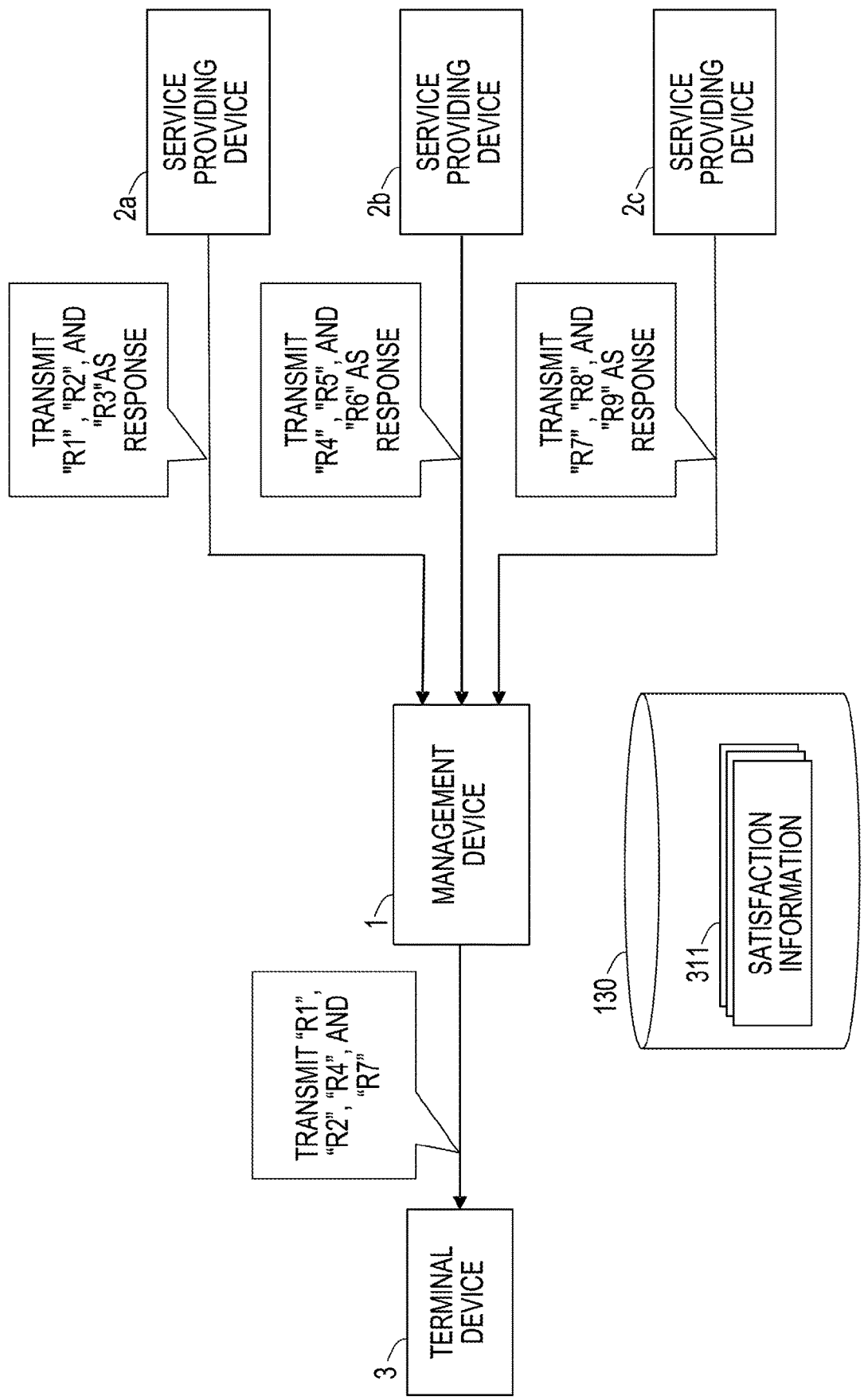
FIG. 14 is a diagram for describing a management process in an embodiment.

Thereafter, when the management device 1 receives the response to the request from each of the service providing devices 2 which transmits the request, the management device 1 acquires the information in each response so that the information acquired from the response received from the service providing device 2 identified in the process of S13 is larger than the information acquired in the response received from another service providing device 2. Then, the management device 1 transmits each piece of information acquired from each response to the terminal device 3. Specifically, for example, as illustrated in FIG. 14, when the management device 1 receives the response including "R1", "R2", and "R3" from the service providing device 2a, receives a response including "R3", "R4", and "R5" from a service providing device 2b, and receives a response including "R7", "R8", and "R9" from a service providing device 2c, in the case where the service providing device 2a is determined as the priority service providing device 2 the management device 1 acquires, for example, each of "R1", "R2", "R4", and "R7" and transmits each of "R1", "R2", "R4", and "R7" to the terminal device 3.

Hereinafter, the processes described in FIGS. 11 and 12 will be referred to as a switching transmission process and the processes described in FIGS. 13 and 14 will be referred to as a distribution transmission process.

[Details of Management Process in Case of Performing Switching Transmission Process]

Next, descriptions will be made on the details of the embodiment in the case of performing the switching transmission process. FIGS. 15 to 21 are flowcharts for describing details of the management process in the case of performing the switching transmission process. Further, FIGS. 22A, 22B, 23A, and 23B are diagrams for describing the details of the management process in the case of performing the switching transmission process.

[Management Process 1 in Terminal Device]

Figure 15:
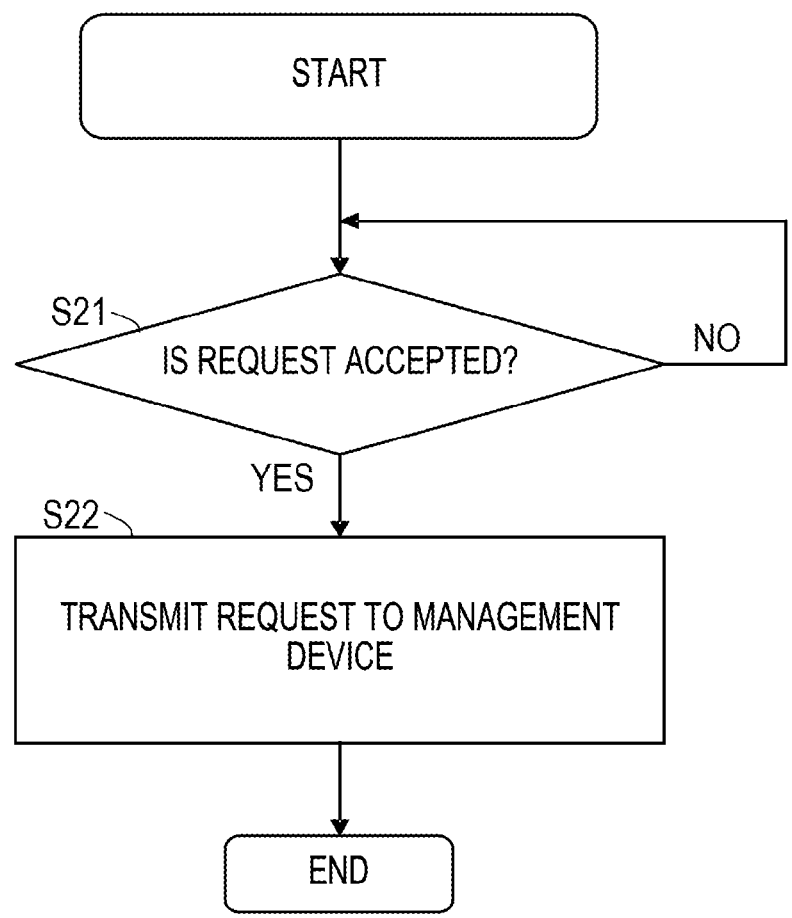
FIG. 15 is a flowchart for describing details of a management process in the case of performing a switching transmission process.

First, a portion of processes of the management processes in the terminal device 3. FIG. 15 is a flowchart for describing a portion of processes of the management processes in the terminal device 3.

The request accepting unit 311 of the terminal device 3 waits until the request is accepted as illustrated in FIG. 15 ("NO" in S21). Specifically, the request accepting unit 311 waits until the user inputs the request in the terminal device 3.

When accepting the request ("YES" in S21), the request transmitting unit 312 of the terminal device 3 transmits the request accepted by the process of S21 to the management device 1 (S22).

[Management Process 1 in Management Device]

Figure 16:
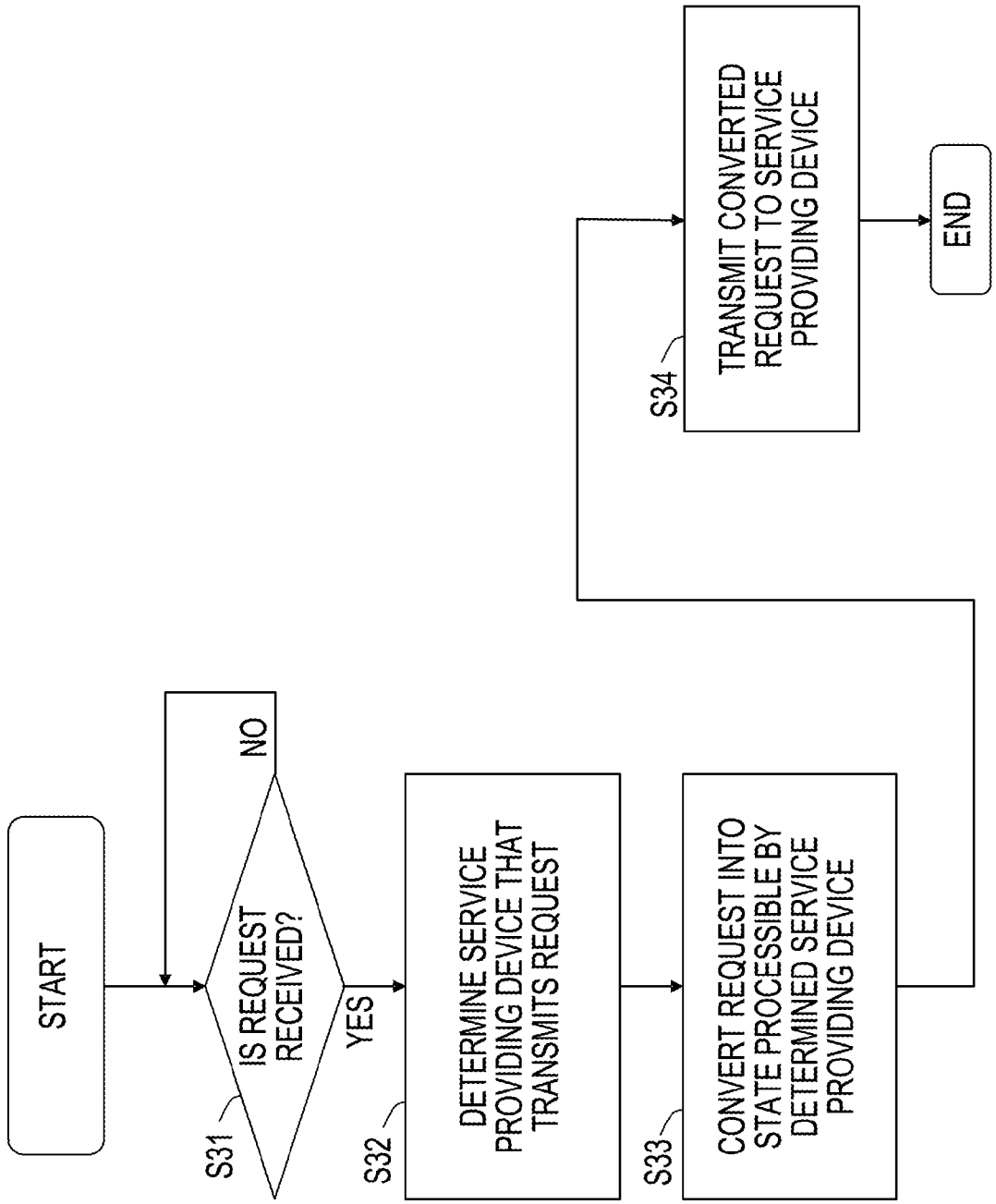
FIG. 16 is a flowchart for describing details of a management process in the case of performing a switching transmission process.

Next, descriptions will be made on a portion of processes of the management processes in the management device 1. FIG. 16 is a flowchart for describing a portion of processes of the management processes in the management device 1.

The request receiving unit 113 of the management device 1 waits until the request is received as illustrated in FIG. 16 ("NO" in S31). Specifically, the request receiving unit 113 waits until the request transmitted by the terminal device 3 is received.

When receiving the request ("YES" in S31), the request converting unit 114 of the management device 1 determines the service providing device 2 that transmits the request received by the process of S31 by referring to the setting information 131 and the distribution information 132 stored in the information storage area 130 (S32). Hereinafter, specific examples of the setting information 131 and the distribution information 132 will be described.

[Specific Example of Setting Information]

First, a specific example of the setting information 131 will be described.

FIGS. 22A and 22B are diagrams for describing specific examples of setting information 131 and distribution information 132. Specifically, FIG. 22A is a diagram for describing the specific example of the setting information 131. FIG. 22B is a diagram for describing the specific example of the distribution information 132.

The setting information 131 illustrated in FIG. 22A includes an "item number" that identifies each piece of information included in the setting information 131, a "redetermination type" in which information used for determining whether to switch the priority service providing device 2 is set, and a "redetermination timing" in which a timing of switching the priority service providing device 2 is set, as items. Further, the setting information 131 illustrated in FIG. 22A includes a "processing method" in which a transmission method of the request is set, "main engine identification information" in which information representing a service providing device 2 initially used as the priority service providing device 2 is set, and a "request transmission frequency" in which a frequency of transmitting the request to the priority service providing device 2 is set, as the items. In the "processing method", the "switching transmission" representing the processes described in FIGS. 12 and 13 or the "distribution transmission" representing the processes described in FIGS. 14 and 15 is set.

Specifically, in the setting information 131 illustrated in FIG. 22A, in information in which the "item number" is "1", a "request number" is set as the "redetermination type" and "1000 (times)" is set as the "redetermination timing". That is, the setting information 131 illustrated in FIG. 22A represents that each time any one of the requests for each user reaches 1000 (times), the redetermination of the priority service providing device 2 corresponding to the user is performed.

The redetermination of the priority service providing device 2 corresponding to all users may be performed at a predetermined time interval (e.g., every hour). In this case, in the setting information 131, for example, a "time" representing that the redetermination of the priority service providing device 2 corresponding to all users is performed in accordance with lapse of time may be set as the "redetermination type" and "one hour" may be set as the "redetermination timing".

In the setting information 131 illustrated in FIG. 22A, in information in which the "item number" is "1", the "switching transmission" representing the switching transmission process is set as the "processing method", "2a" is set as the "main engine identification information", and "0.5" is set as the "request transmission frequency".

That is, the setting information 131 illustrated in FIG. 22A indicates that the service providing device 2 used first as the priority service providing device 2 is the service providing device 2a. Further, the setting information 131 illustrated in FIG. 22A indicates that the ratio of sorting the requests from each user to the priority service providing device 2 is 50(%). In addition, a ratio of sorting the requests from the respective users to respective service providing devices 2 other than the priority service providing device 2 may be a ratio obtained by equally dividing the ratio other than the ratio of sorting the requests to the priority service providing device 2.

[Specific Example of Distribution Information]

Next, descriptions will be made on a specific example of the distribution information 132.

FIG. 22B is a diagram for describing the specific example of the distribution information 132. The distribution information 132 illustrated in FIG. 22B includes the "item number" that identifies each piece of information included in the distribution information 132, the "user identification information" that identifies each user (the terminal device 3 used by each user), and the "main engine identification information" in which the information representing the service providing device 2 currently used as the priority service providing device 2 is set, as the items.

Specifically, in the distribution information 132 illustrated in FIG. 22B, in the information in which the "item number" is "1", "3a" indicating a terminal device 3a is set as the "user identification information", and "2a" indicating the service providing device 2a is set as the "main engine identification information". That is, the distribution information 132 illustrated in FIG. 22B indicates that the request transmitted from the terminal device 3a is preferentially classified to the service providing device 2a.

In the distribution information 132 illustrated in FIG. 22B, in the information in which the "item number" is "2", "3b" indicating a terminal device 3b is set as the "user identification information", and "2c" indicating a service providing device 2c is set as the "main engine identification information". That is, the distribution information 132 illustrated in FIG. 22B indicates that the request transmitted from the terminal device 3b is preferentially sorted to the service providing device 2c. A description of other information included in FIG. 22B is omitted.

Therefore, for example, when receiving the request from the terminal device 3a, the request converting unit 114 refers to the distribution information 132 described in FIG. 22B in the process of S32 to identify "2a" which is information set in the "main engine identification information" of the information in which "3a" is set as the "user identification information". Then, the request converting unit 114 refers to the setting information 131 described in FIG. 22A to determine the service providing device 2 that transmits the request transmitted from the terminal device 3a so that a ratio of requests sorted to the service providing device 2a, a ratio of requests sorted to the service providing device 2b, and a ratio of requests sorted to the service providing device 2c become 50:25:25 (2:1:1).

Referring back to FIG. 16, the request converting unit 114 converts the request received in the process of S31 into a state that may be processed by the service providing device 2 determined in the process of S32 (S33).

Thereafter, the request transmitting unit 115 transmits the request converted in the process of S33 to the service providing device 2 determined in the process of S32 (S34).

[Management Process in Service Providing Device]

Figure 17:
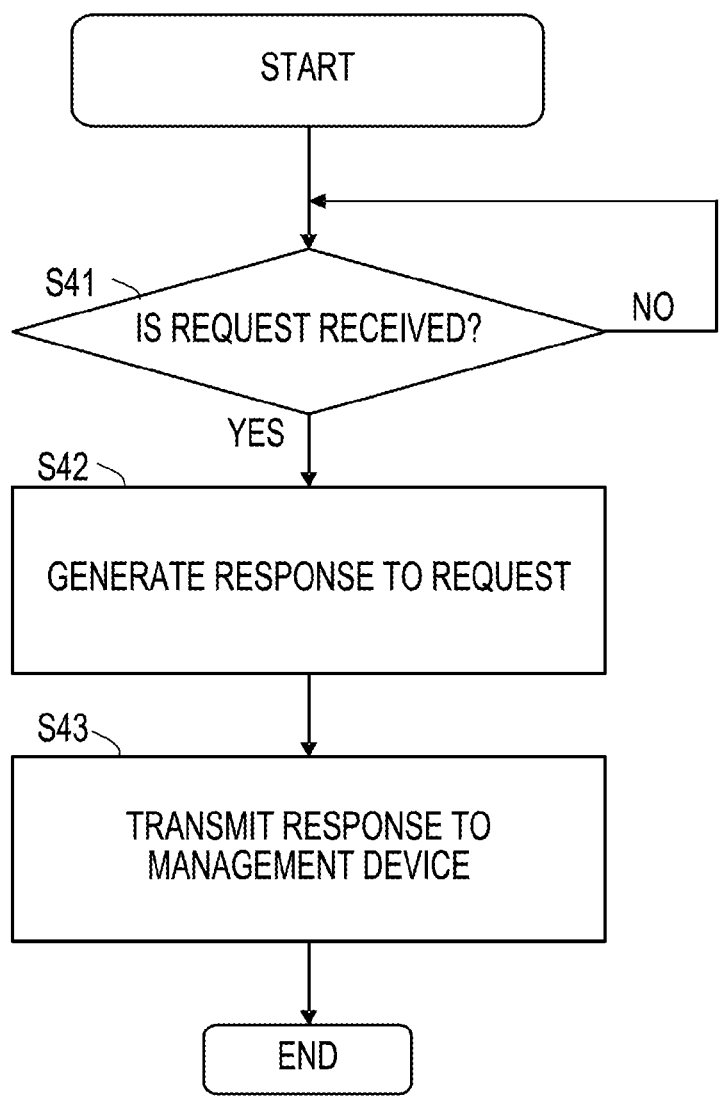
FIG. 17 is a flowchart for describing details of a management process in the case of performing a switching transmission process.

Next, descriptions will be made on a portion of processes of the management processes in the service providing device 2. FIG. 17 is a flowchart for describing a portion of processes of the management processes in the service providing device 2.

The request receiving unit 211 of the service providing device 2 waits until the request is received as illustrated in FIG. 17 ("NO" in S41). Specifically, the request receiving unit 211 waits until the request transmitted by the management device 1 is received.

Then, when receiving the request ("YES" in S41), the response generating unit 212 of the service providing device 2 generates the response to the request received in the process of S41 (S42). Specifically, for example, when receiving the request for requesting information on an accommodation facility that meets the condition, the response generating unit 212 generates a response including the information on the accommodation facility that meets the condition.

Thereafter, the response transmitting unit 213 of the service providing device 2 transmits the response generated in the process of S42 to the management device 1 (S43).

[Management Process 2 in Management Device]

Figure 18:
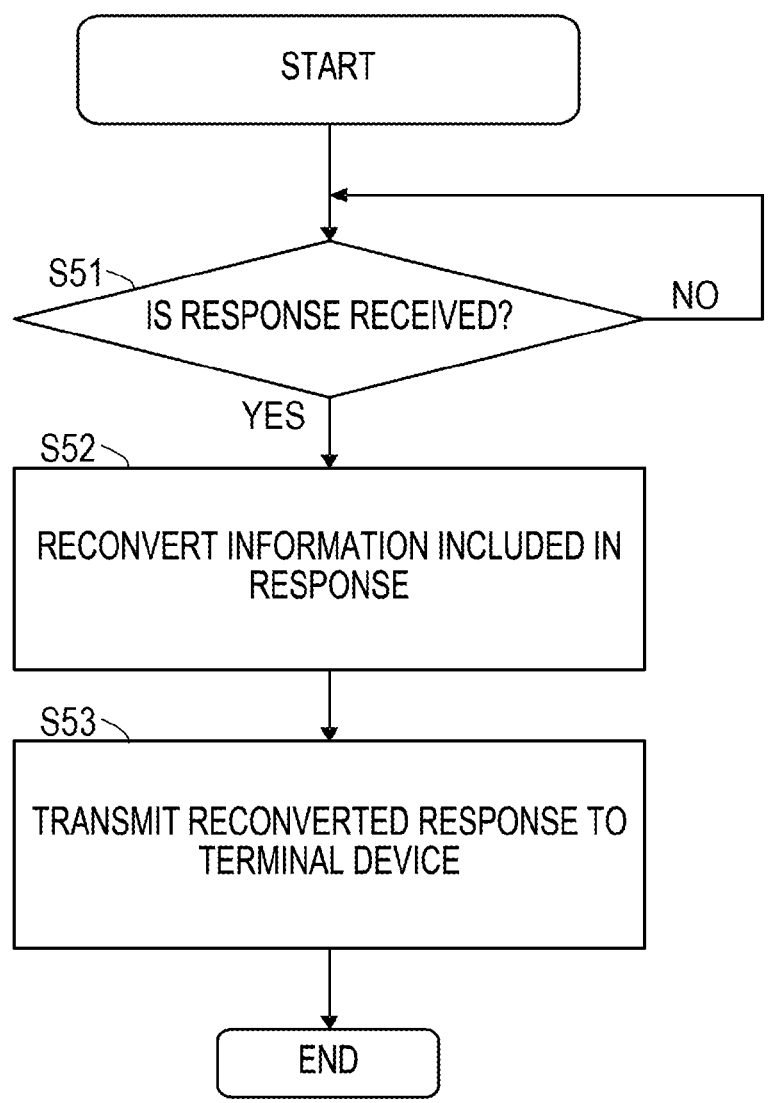
FIG. 18 is a flowchart for describing details of a management process in the case of performing a switching transmission process.

Next, descriptions will be made on a portion of processes of the management processes in the management device 1. FIG. 18 is a flowchart for describing a portion of processes of the management processes in the management device 1.

The response receiving unit 116 of the management device 1 waits until the response to the request is received as illustrated in FIG. 18 ("NO" in S51). Specifically, the response receiving unit 116 waits until the response transmitted by the service providing device 2 is received.

When receiving the response ("YES" in S51), the response converting unit 117 of the management device 1 performs reconversion corresponding to the conversion performed in the process of S33 with respect to the information included in the response received in the process of S51 (S52).

Thereafter, the response converting unit 117 transmits the request reconverted in the process of S52 to the terminal device 3 that transmits the request received by the process of S31 (S53).

[Management Process 2 in Terminal Device]

Figure 19:
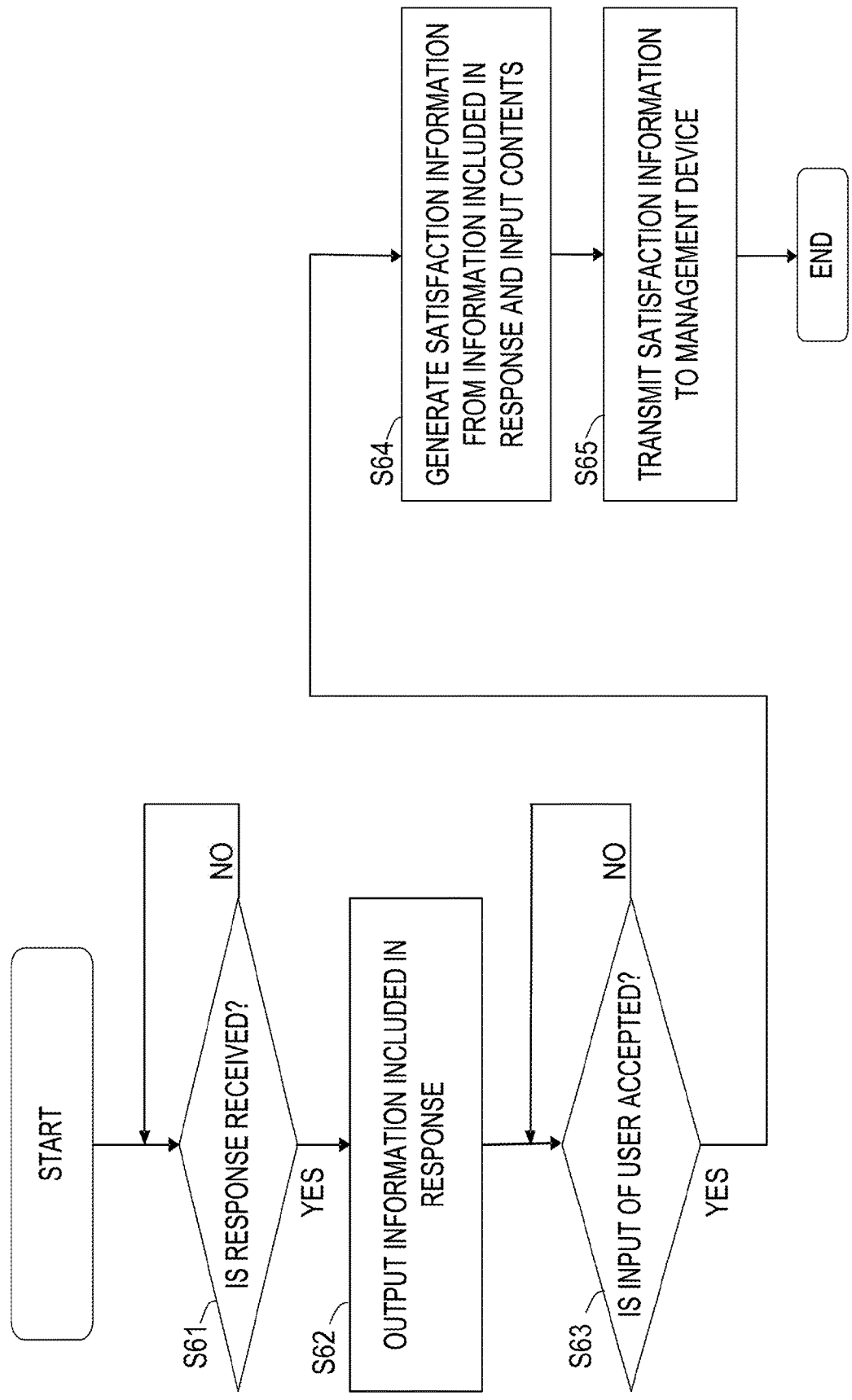
FIG. 19 is a flowchart for describing details of a management process in the case of performing a switching transmission process.

Next, descriptions will be made on a portion of processes of the management processes in the terminal device 3. FIG. 19 is a flowchart for describing a portion of processes of the management processes in the terminal device 3.

The response receiving unit 313 of the terminal device 3 waits until the response is received as illustrated in FIG. 19 (S61). Specifically, the response receiving unit 313 waits until the response transmitted by the management device 1 is received.

Then, the information output unit 314 of the terminal device 3 outputs the information included in the response received in the process of S61 to the output device (not illustrated) (S62). That is, the information output unit 314 presents the information included in the response to the request to the user who makes the request.

Thereafter, the information accepting unit 315 of the terminal device 3 waits until receiving input of the user with respect to the information output in the process of S62 (S63). Specifically, the information accepting unit 315 waits, for example, until an input indicating that one of the information output in the process of S62 is adopted or an input indicating that information from the information output in the process of S62 is not adopted is accepted.

Then, the information generating unit 316 of the terminal device 3 generates the satisfaction information 331 from the information included in the response received in the process of S61 and contents of the input accepted in the process of S63 (S64). Further, the information generating unit 316 may store the generated satisfaction information 331 in the information storage area 330. Hereinafter, the specific example of the satisfaction information 331 will be described.

[Specific Example of Satisfaction Information]

FIGS. 23A and 23B are diagrams for describing a specific example of satisfaction information 331. Specifically, FIG. 23A is a diagram for describing the specific example of the satisfaction information 331 generated by the terminal device 3.

The satisfaction information 331 illustrated in FIG. 23A includes the "item number" that identifies each piece of information included in the satisfaction information 331, the "user identification information" that identifies its own device (terminal device 3), and the "engine identification information" in which the information (e.g., information included in the response to the request) indicating the service providing device 2 that generates the response to the request is set as the items. Further, the satisfaction information 331 illustrated in FIG. 23A has, as the item, "adoption availability" in which information indicating whether the user adopts the information included in the response to the request is set. In the "adoption availability", the term "TRUE" representing that the user adopts any of information included in the response is set or the term "FAULT" representing that the user does not adopt the information included in the response is set.

Specifically, as illustrated in FIG. 23A, the information generating unit 316 sets the "user identification information" and "3a" of the information in which the "item number" is "1", sets "2a" as the "engine identification information", and sets "TRUE" as the "adoption availability".

Referring back to FIG. 19, the information transmitting unit 317 of the terminal device 3 transmits the satisfaction information 331 generated in the process of S64 to the management device 1 (S65).

[Management Process 3 in Management Device]

Figure 20:
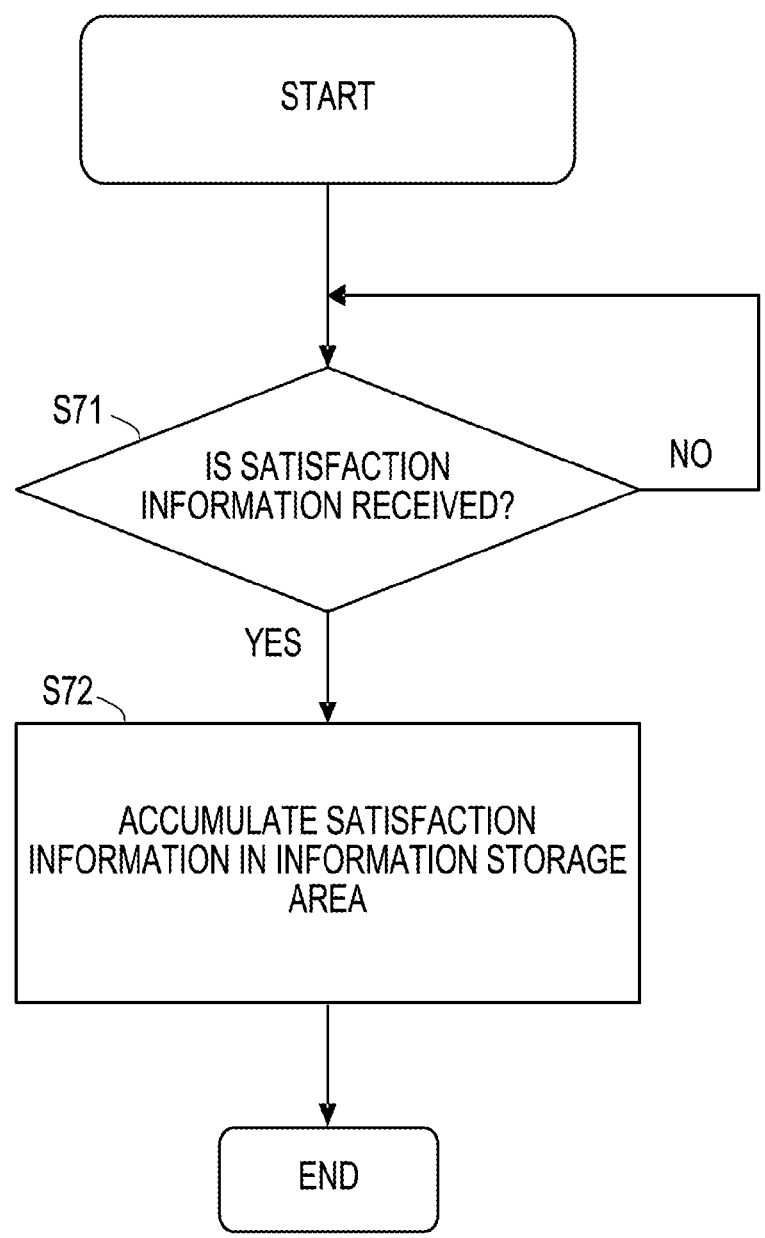
FIG. 20 is a flowchart for describing details of a management process in the case of performing a switching transmission process.

Next, descriptions will be made on a portion of processes of the management processes in the management device 1. FIG. 20 is a flowchart for describing a portion of processes of the management processes in the terminal device 1.

As illustrated in FIG. 20, the information receiving unit 111 waits until the satisfaction information 331 is received ("NO" in S71). Specifically, the information receiving unit 111 waits until the satisfaction information 331 transmitted by the terminal device 3 is received.

Then, when receiving the satisfaction information 331 ("YES" in S71), the information receiving unit 111 updates the satisfaction information 332 stored (accumulated) in the information storage area 130 based on the satisfaction information 331 received in S71 (S72). Hereinafter, descriptions will be made on the specific example of the satisfaction information 332 accumulated in the information storage area 130.

[Specific Example of Accumulated Satisfaction Information]

FIG. 23B is a diagram for describing the specific example of the satisfaction information 332 accumulated in the information storage area 130.

The satisfaction information 332 illustrated in FIG. 23B has an "item number", "user identification information", and "engine identification information" as items, similarly to the satisfaction information 331 described in FIG. 22A. Further, the satisfaction information 332 illustrated in FIG. 23B has an "adoption number" in which the number of information in which "TRUE" is set in the "adoption availability" is set, and a "reception number" in which the number of satisfaction information 331 received from the terminal device 3 is set among the satisfaction information 331 received from the terminal device 3, as the items.

Specifically, in the satisfaction information 332 illustrated in FIG. 23B, in information in which the "item number" is "1", "3a" is set as the "user identification information", "2a" is set as the "engine identification information", "8" is set as the "adoption number", and "20" is set as the "reception number".

In the satisfaction information 332 illustrated in FIG. 23B, in information in which the "item number" is "2", "3a" is set as the "user identification information", "2b" is set as the "engine identification information", "3" is set as the "adoption number", and "10" is set as the "reception number". A description of other information included in FIG. 23B is omitted.

[Management Process 4 in Management Device]

Figure 21:
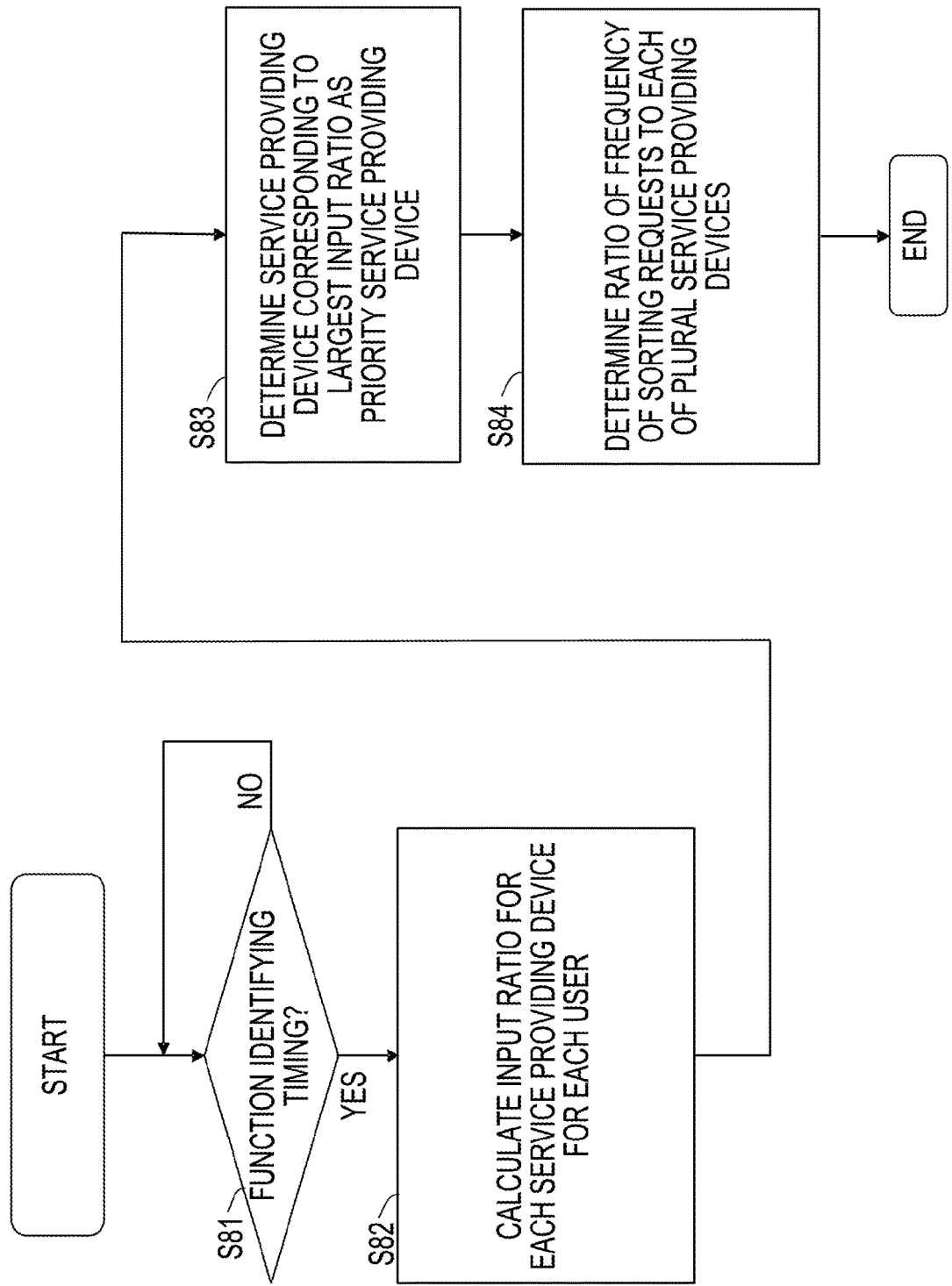
FIG. 21 is a flowchart for describing details of a management process in the case of performing a switching transmission process.

Next, descriptions will be made on a portion of processes of the management processes in the management device 1. FIG. 21 is a flowchart for describing a portion of processes of the management processes in the management device 1.

As illustrated in FIG. 21, the function identifying unit 112 waits until a function identifying timing comes ("NO" in S81).

Specifically, in the setting information 131 illustrated in FIG. 22A, in information in which the "item number" is "1", the "request number" is set as the "redetermination type" and "1000 (times)" is set as the "redetermination timing". As a result, in this case, the function identifying timing becomes a timing at which any one of the requests for respective users reaches a multiple of 1000 times.

When the function identifying timing comes ("YES" in S81), the function identifying unit 112 calculates an input ratio which is a ratio at which the input of the information indicating satisfaction with the response transmitted from each service providing device 2 is performed by each user for each service providing device 2 for each user by referring to the satisfaction information 331 stored (accumulated) in the information storage area 130 (S82).

That is, for example, the function identifying unit 112 calculates the ratio of information in which "TRUE" is set as the "adoption availability" among the satisfaction information 331 transmitted from the terminal device 3, as an input ratio, for each service providing device 2 for each user.

Specifically, in the satisfaction information 331 illustrated in FIG. 23B, in the information (having "1" as the "item number") in which "3a" is set as the "user identification information" and "2a" is set as the "engine identification information", "8" and "20" are set as the "adoption number" and the "reception number", respectively. As a result, in this case, the function identifying unit 112 calculates "0.4" which is a value obtained by dividing "8" by "20", for example, as the input ratio corresponding to the terminal device 3a and the service providing device 2a. Similarly, the function identifying unit 112 calculates "0.3", for example, as the input ratio corresponding to the terminal device 3a and the service providing device 2b, and calculates "0.2", for example, as the input ratio corresponding to the terminal device 3a and the service providing device 2c.

Subsequently, the function identifying unit 112 determines the service providing device 2 corresponding to the largest input ratio among the input ratios identified in the process of S82 for each user as the priority service providing device 2 (S83).

Specifically, for example, when "0.4", "0.3", and "0.2" are calculated as the input ratios corresponding to the terminal device 3a, the service providing device 2a corresponding to "0.4" which is the largest input ratio is determined as the priority service providing device 2.

In the process of S83, when it is determined that a changed user is present in the priority service providing device 2, the function identifying unit 112 updates the distribution information 132 stored in the information storage area 130.

Thereafter, the function identifying unit 112 determines the ratio of the frequency of sorting the request with respect to each of the plurality of service providing devices 2 so that the ratio corresponding to the priority service providing device 2 determined in the process of S83 is higher than the ratio corresponding to another service providing device 2 (S84).

Specifically, in the setting information 131 described in FIG. 22A, "0.5" is set as a "request transmission frequency". Therefore, when the priority service providing device 2 determined in the process of S83 is the service providing device 2a, the function identifying unit 112 determines the service providing device 2 that transmits the request transmitted in the terminal device 3a, for example, so that the ratio of the requests sorted to the service providing device 2a, the ratio of the requests sorted to the service providing device 2b, and the ratio of the requests sorted to the service providing device 2c become 50:25:25 (2:1:1).

As a result, the management device 1 may rapidly change the priority service providing device 2 even when the changed user is present in the priority service providing device 2. As a result, the management device 1 may maintain the matching establishment rate at the high level while further suppressing the frequency of the functional change.

[Details of Management Process in Case of Performing Distribution Transmission Process]

Figure 29:
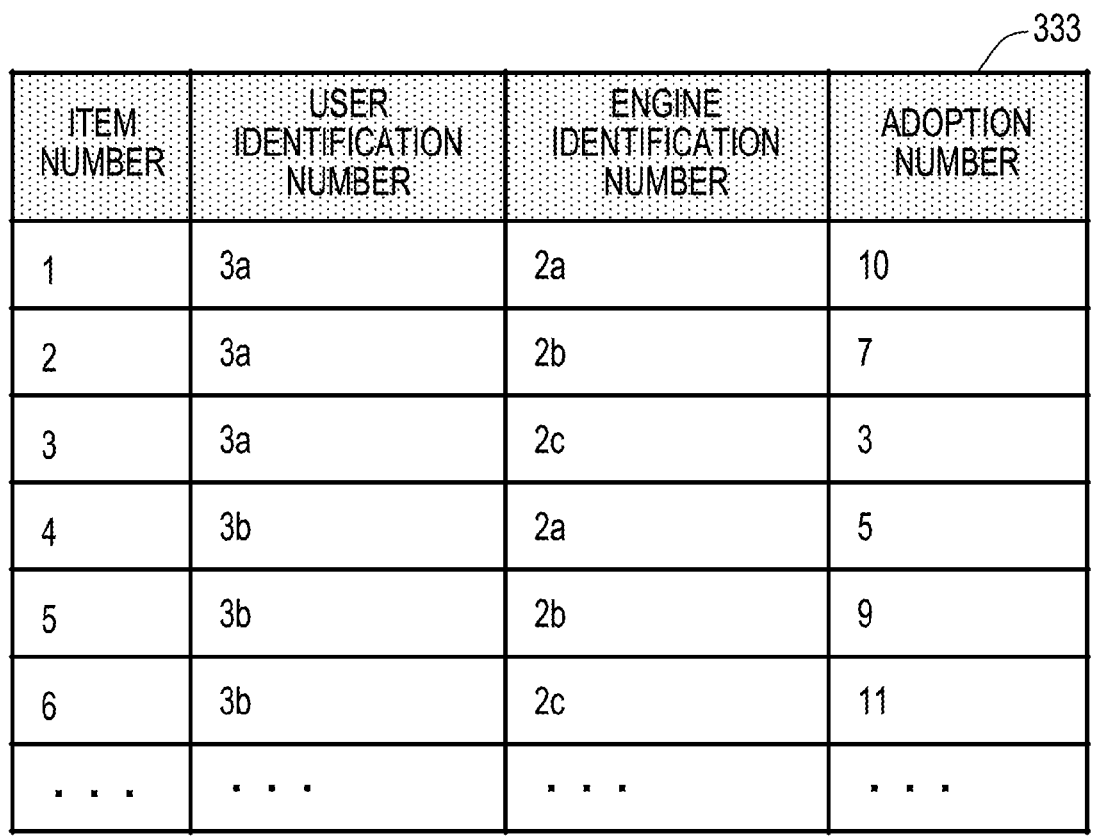
FIG. 29 is a diagram for describing a specific example of satisfaction information 331.

Next, descriptions will be made on the details of the embodiment in the case of performing the distribution transmission process. FIGS. 24 to 27 are flowcharts for describing details of the management process in the case of performing the distribution transmission process. Further, FIGS. 28A, 28B, and 29 are diagrams for describing the details of the management process in the case of performing the distribution transmission process. Specifically, FIGS. 28A and 28B are diagrams for describing specific examples of setting information 131 and distribution information 132, and FIG. 29 is a diagram for describing a specific example of satisfaction information 331. Hereinafter, descriptions will be made on only different processes from the details of the embodiment in the case of performing the switching transmission process.

[Management Process 1 in Management Device]

First, descriptions will be made on some processes of the management processes in the management device 1. FIG. 24 is a flowchart for describing some processes of the management processes in the terminal device 1.

The request receiving unit 113 waits until the request is received as illustrated in FIG. 24 ("NO" in S101). Specifically, the request receiving unit 113 waits until the request transmitted by the terminal device 3 is received.

When receiving the request ("YES" in S101), the request converting unit 114 determines the service providing device 2 that transmits the request received by the process of S101 by referring to the setting information 131 and the distribution information 132 stored in the information storage area 130 (S102).

Subsequently, the request converting unit 114 converts the request received in the process of S101 into a state that may be processed by each service providing device 2 (S103).

Thereafter, the request transmitting unit 115 transmits the request converted in the process of S103 to each service providing device 2 (S104).

In other words, in this case, unlike the case of performing the switching transmission process, the management device 1 converts the request received from the terminal device 3 into a format which may be processed by each service providing device 2 and transmits the converted request to each service providing device 2.

[Management Process 2 in Management Device]

Figure 25:
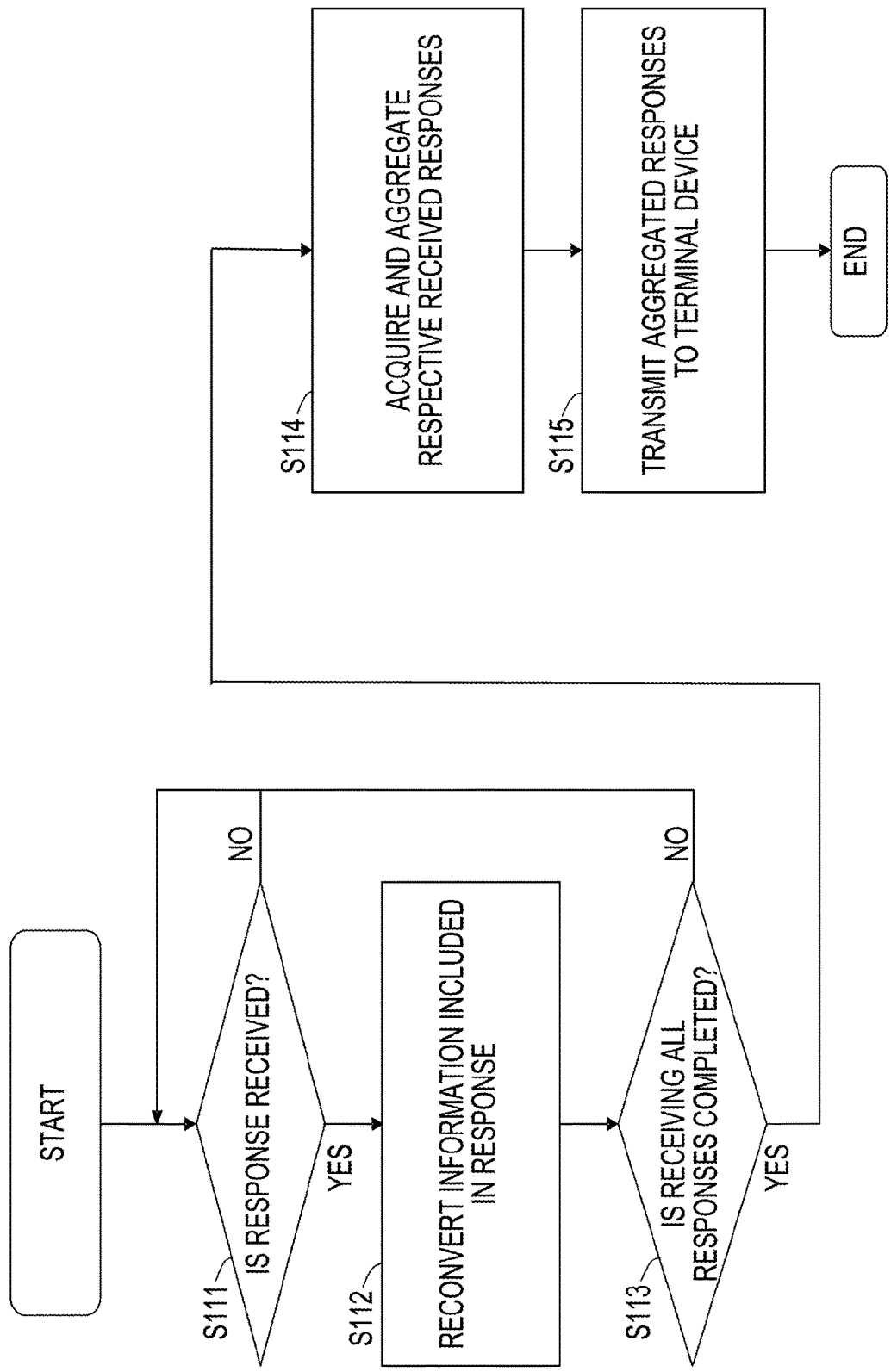
FIG. 25 is a flowchart for describing details of a management process in the case of performing a distribution transmission process.

Next, descriptions will be made on some processes of the management processes in the management device 1. FIG. 25 is a flowchart for describing some processes of the management processes in the terminal device 1.

The response receiving unit 116 waits until the response to the request is received as illustrated in FIG. 25 ("NO" in S111). Specifically, the response receiving unit 116 waits until the response is received from any one of the service providing devices 2 that transmits the request in the process of S104.

When receiving the response ("YES" in S111), the response converting unit 117 performs reconversion corresponding to the conversion performed in the process of S103 with respect to the information included in the response received in the process of S111 (S112).

Subsequently, the response aggregating unit 118 of the management device 1 determines whether the response is received from all service providing devices 2 in the process of S111 (S113).

As a result, when it is determined that the responses are not received from all service providing devices 2 ("NO" in S113), the response receiving unit 116 performs the process after S111 again.

Meanwhile, when it is determined that the responses are received from all service providing devices 2 ("YES" in S113), the response aggregating unit 118 acquires information from respective responses received in the process of S111, respectively and aggregates the acquired information by referring to the setting information 131 and the distribution information 132 stored in the information storage area 130 (S114).

Specifically, in the distribution information 132 illustrated in FIG. 28B, "2a" is set as the "main engine identification information" of the information (having "1" as the "item number" is) in which "3a" is set as the "user identification information". Further, in the setting information 131 described in FIG. 28A, "0.5" is set as the "request transmission frequency". As a result, for example, when a transmission source of the request received in the process of S101 is the terminal device 3a, the response aggregating unit 118 acquires and aggregates the information in the respective responses so that a ratio of an information amount acquired in the response corresponding to the service providing device 2a, an information amount acquired in the response corresponding to the service providing device 2b, and an information amount acquired in the response corresponding to the service providing device 2c becomes 50:25:25 (2:1:1) and the sum of the information amount acquired from each service providing device 2 becomes equal to a predetermined information amount as an information amount transmitted by the terminal device 3.

Thereafter, the response converting unit 117 transmits the responses aggregated in the process of S114 to the terminal device 3 that transmits the request received in the process of S101 (S115).

[Management Process 3 in Management Device]

Figure 26:
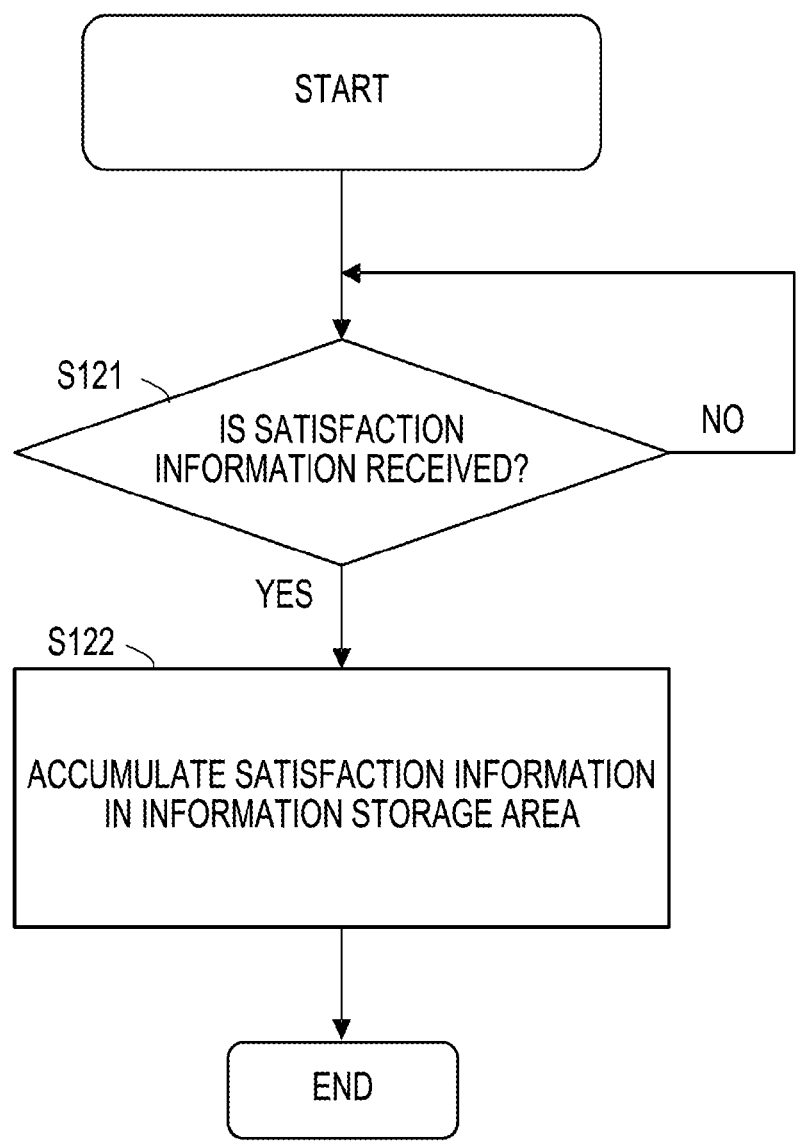
FIG. 26 is a flowchart for describing details of a management process in the case of performing a distribution transmission process.

Next, descriptions will be made on some processes of the management processes in the management device 1. FIG. 26 is a flowchart for describing some processes of the management processes in the management device 1.

As illustrated in FIG. 26, the information receiving unit 111 waits until the satisfaction information 331 is received ("NO" in S121). Specifically, the information receiving unit 111 waits until the satisfaction information 331 transmitted by the terminal device 3 is received.

Then, when receiving the satisfaction information 331 ("YES" in S121), the information receiving unit 111 updates the satisfaction information 333 stored (accumulated) in the information storage area 130 based on the satisfaction information 331 received in S121 (S122). Hereinafter, descriptions will be made on the specific example of the satisfaction information 333 accumulated in the information storage area 130.

[Specific Example of Accumulated Satisfaction Information]

FIG. 29 is a diagram for describing the specific example of the satisfaction information 333 accumulated in the information storage area 130.

The satisfaction information 333 illustrated in FIG. 29 has the "item number", the "user identification information", the "main engine identification information", and the "adoption number" as the items, similarly to the satisfaction information 332 described in FIG. 23B. Meanwhile, the satisfaction information 333 illustrated in FIG. 29 does not have the "reception number" as the item unlike the satisfaction information 332 described in FIG. 23B.

Specifically, in the satisfaction information 333 illustrated in FIG. 29, in information in which the "item number" is "1", "3a" is set as the "user identification information", "2a" is set as the "engine identification information", and "10" is set as the "adoption number".

In the satisfaction information 333 illustrated in FIG. 29, in the information in which the "item number" is "2", "3a" is set as the "user identification information", "2b" is set as the "engine identification information", and "7" is set as the "adoption number". A description of other information included in FIG. 29 is omitted.

[Management Process 4 in Management Device]

Figure 27:
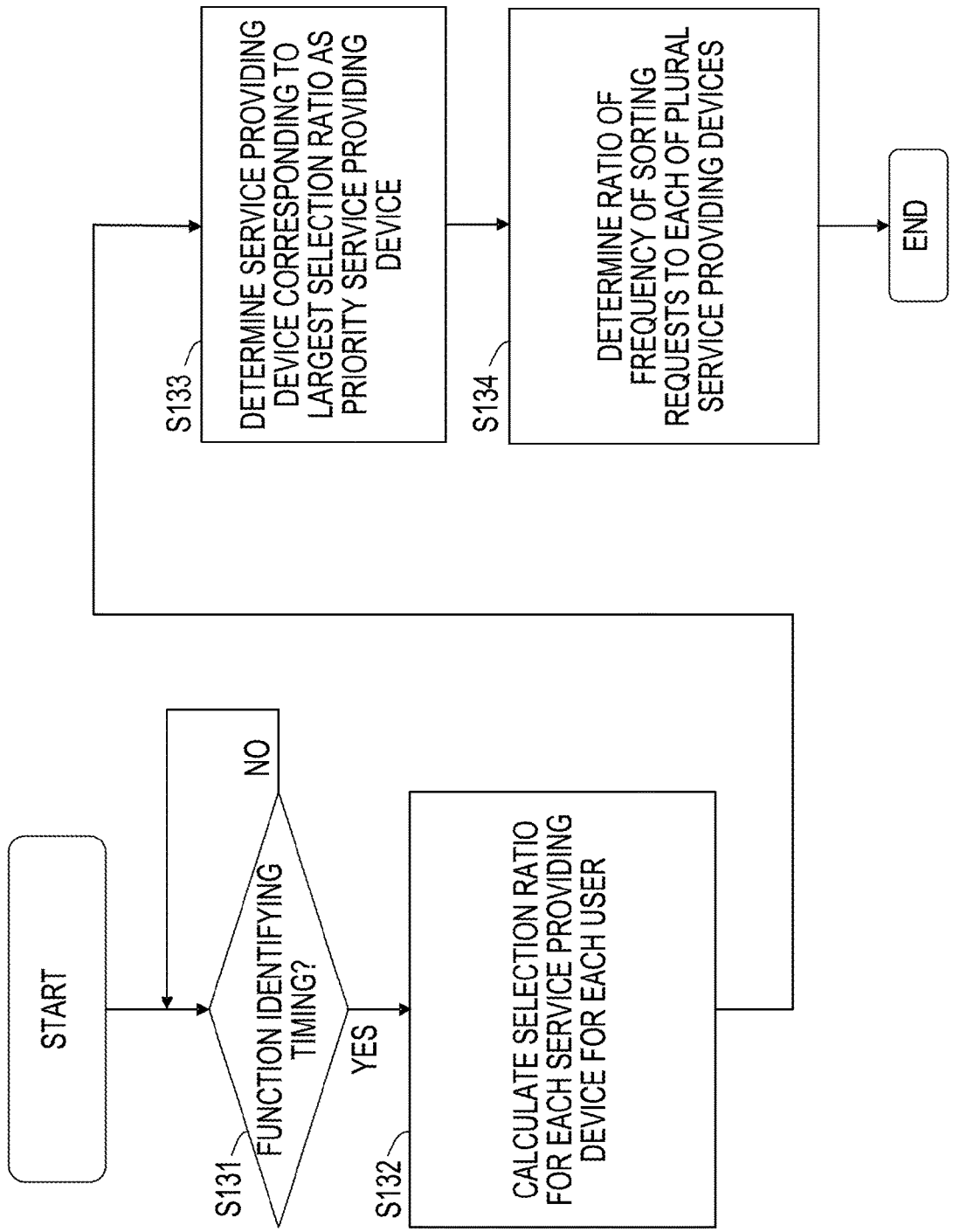
FIG. 27 is a flowchart for describing details of a management process in the case of performing a distribution transmission process.

Next, descriptions will be made on some processes of the management processes in the management device 1. FIG. 27 is a flowchart for describing some processes of the management processes in the management device 1.

As illustrated in FIG. 27, the function identifying unit 112 waits until a function identifying timing comes ("NO" in S131).

Specifically, in the setting information 131 illustrated in FIG. 28A, in information in which the "item number" is "1", the "request number" is set as the "redetermination type" and "1000 (times)" is set as the "redetermination timing". As a result, in this case, the function identifying timing becomes a timing at which any one of the requests for respective users reaches a multiple of 1000 times.

When the function identifying timing comes ("YES" in S131), the function identifying unit 112 calculates a selection ratio which is a ratio of the information included in the response transmitted from each service providing device 2 among information selected as information satisfied by each user for each of the plurality of service providing devices 2 for each user by referring to the satisfaction information 333 stored (accumulated) in the information storage area 130 (S132).

Specifically, in the satisfaction information 333 illustrated in FIG. 29, each of "10", "7", and "3" is set as the "adoption number" of the information (having "1" to "3" as the "item number") in which "3a" is set as the "user identification information". As a result, the function identifying unit 112 calculates "0.5" which is a value obtained by dividing "10" by "20" as the sum of "10", "7", and "3", for example, as the selection ratio corresponding to the terminal device 3a and the service providing device 2a. Further, the function identifying unit 112 calculates "0.35" which is a value obtained by dividing "7" by "20", for example, as the selection ratio corresponding to the terminal device 3a and the service providing device 2b. Moreover, the function identifying unit 112 calculates "0.15" which is a value obtained by dividing "3" by "20", for example, as the selection ratio corresponding to the terminal device 3a and the service providing device 2c.

Subsequently, the function identifying unit 112 determines a service providing device 2 corresponding to the largest selection ratio among the selection ratios calculated in the process of S132 as the priority service providing device 2 for each user (S133).

Specifically, when "0.5", "0.35", and "0.15" are calculated, for example, as the selection ratios corresponding to the terminal device 3a, the service providing device 2a corresponding to "0.5" which is the largest input ratio is determined as the priority service providing device 2.

In the process of S133, when it is determined that the changed user is present in the priority service providing device 2, the function identifying unit 112 updates the distribution information 132 stored in the information storage area 130.

Thereafter, the function identifying unit 112 determines the ratio of the frequency of sorting the request with respect to each of the plurality of service providing devices 2 so that the ratio corresponding to the priority service providing device 2 determined in the process of S133 becomes higher than the ratio corresponding to another service providing device 2 (S134).

Specifically, in the setting information 131 described in FIG. 28A, "0.5" is set as the "request transmission frequency". Therefore, when the priority service providing device 2 determined in the process of S133 is the service providing device 2a, the function identifying unit 112 determines the service providing device 2 that transmits the request transmitted in the terminal device 3a, for example, so that the ratio of the requests sorted to the service providing device 2a, the ratio of the requests sorted to the service providing device 2b, and the ratio of the requests sorted to the service providing device 2c become 50:25:25 (2:1:1).

As a result, the management device 1 may rapidly change the priority service providing device 2 even when the changed user is present in the priority service providing device 2. As a result, the management device 1 may maintain the matching establishment rate at the high level while further suppressing the frequency of the functional change.

As described above, the management device 1 in the embodiment accumulates the satisfaction information 331 representing whether the user who makes the request is satisfied with the response to the request in the information storage area 130 in a format of the satisfaction information 333. In addition, based on the accumulated satisfaction information 333, the management device 1 determines, for each user, among a plurality of service providing devices 2 that generates the response to the request, a service providing device 2 in which the degree of satisfaction meets a predetermined condition as a priority service providing device 2 which is preferentially used at the time of generating the response to the request from each user.

That is, the management device 1 acquires and accumulates, for example, satisfaction information 331 representing whether the user who receives the response to the request adopts the information whenever the request is generated in the format of the satisfaction information 333. In addition, the management device 1 identifies the service providing device 2 which may generate a response having a high degree of satisfaction of the user for each user by referring to the satisfaction information 333.

As a result, the management device 1 may preferentially transmit the request to the service providing device 2 which may increase the matching establishment rate for each user. As a result, the management device 1 may maintain the matching establishment rate at the high level while suppressing the frequency of the functional change.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. A non-transitory computer-readable recording medium having stored therein a program that causes a computer to execute a process, the process comprising:
   accumulating, for each user, satisfaction information that represents whether users who make requests are satisfied with responses received from service providing functions that generate the responses to the requests of the users, to a memory, the satisfaction information including identification information that indicates, among the service providing functions, a service providing function that generates the response satisfied by the user;
   calculating, for each user, a degree of satisfaction for each of the service providing functions based on the satisfaction information accumulated in the memory;
   identifying, for each user, a service providing function that has the degree of satisfaction that meets a predetermined condition among the service providing functions;
   determining, for each user, the identified service providing function as a preferential service providing function that is preferentially used at a time of generating a response to a request from each user;
   determining, for each user, a ratio of a frequency of sorting requests to each of the service providing functions such that a ratio corresponding to the preferential service providing function is higher than a ratio corresponding to each of service providing functions other than the preferential service providing function;
   sorting, for each user, a request to one of the service providing functions such that a frequency of requests sorted to each of the service providing functions follows the determined ratio; and
   outputting a response received from the one of the service providing functions as information to be presented to each user.

2. The non-transitory computer-readable recording medium according to claim 1, wherein
   the satisfaction information indicates whether the users perform input of information indicating satisfaction with the responses, and
   the process further comprises:
   calculating, for each user, an input ratio at which the input of the information indicating satisfaction is performed for each of the service providing functions based on the satisfaction information; and
   determining, for each user, a service providing function corresponding to a largest input ratio among input ratios calculated for the service providing functions as the preferential service providing function.

3. The non-transitory computer-readable recording medium according to claim 1, the process further comprising:
   determining, for each user, a ratio of a frequency of sorting requests to each of the service providing functions such that a ratio corresponding to the preferential service providing function is higher than a ratio corresponding to each of service providing functions other than the preferential service providing function;
   sorting, for each user, a request transmitted from each user to each of the service providing functions; and acquiring information from a response received from each of the service providing functions such that an amount of information acquired from each response follows the determined ratio; and outputting acquired information as information to be presented to each user.

4. The non-transitory computer-readable recording medium according to claim 3, wherein the satisfaction information indicates satisfied responses for which the users perform input of information indicating satisfaction, and the method further comprises:
   calculating, for each user, a selection ratio which is a ratio of satisfied responses transmitted from each of the service providing functions among satisfied responses transmitted from the service providing functions based on the satisfaction information;

and determining, for each user, a service providing function corresponding to a largest selection ratio among selection ratios calculated for the service providing functions as the preferential service providing function.

5. The non-transitory computer-readable recording medium according to claim 1, the process further comprising: determining the preferential service providing function at a predetermined time interval.

6. The non-transitory computer-readable recording medium according to claim 1, the process further comprising: determining the preferential service providing function whenever each user makes requests a predetermined number of times.

7. A management method of a matching service, the method comprising:

accumulating by a computer, for each user, satisfaction information that represents whether users who make requests are satisfied with responses received from service providing functions that generate the responses to the requests of the users, to a memory, the satisfaction information including identification information that indicates, among the service providing functions, a service providing function that generates the response satisfied by the user;

calculating, for each user, a degree of satisfaction for each of the service providing functions based on the satisfaction information accumulated in the memory;

identifying, for each user, a service providing function that has the degree of satisfaction that meets a predetermined condition among the service providing functions;

determining, for each user, the identified service providing function as a preferential service providing function that is preferentially used at a time of generating a response to a request from each user;

determining, for each user, a ratio of a frequency of sorting requests to each of the service providing functions such that a ratio corresponding to the preferential service providing function is higher than a ratio corresponding to each of service providing functions other than the preferential service providing function;

sorting, for each user, a request to one of the service providing functions such that a frequency of requests sorted to each of the service providing functions follows the determined ratio; and outputting a response received from the one of the service providing functions as information to be presented to each user.

8. The management method of a matching service according to claim 7, wherein the satisfaction information indicates whether the users perform input of information indicating satisfaction with the responses, and the method further comprises:

calculating, for each user, an input ratio at which the input of the information indicating satisfaction is performed for each of the service providing functions based on the satisfaction information; and determining, for each user, a service providing function corresponding to a largest input ratio among input ratios calculated for the service providing functions as the preferential service providing function.

9. The management method of a matching service according to claim 7, further comprising: determining, for each user, a ratio of a frequency of sorting requests to each of the service providing functions such that a ratio corresponding to the preferential service providing function is higher than a ratio corresponding to each of service providing functions other than the preferential service providing function; sorting, for each user, a request transmitted from each user to each of the service providing functions; and acquiring information from a response received from each of the service providing functions such that an amount of information acquired from each response follows the determined ratio; and outputting acquired information as information to be presented to each user.

10. The management method of a matching service according to claim 9, wherein the satisfaction information indicates satisfied responses for which the users perform input of information indicating satisfaction, and the method further comprises: calculating, for each user, a selection ratio which is a ratio of satisfied responses transmitted from each of the service providing functions among satisfied responses transmitted from the service providing functions based on the satisfaction information; and determining, for each user, a service providing function corresponding to a largest selection ratio among selection ratios calculated for the service providing functions as the preferential service providing function.

11. An information processing apparatus, comprising:

a memory; and a processor coupled to the memory and the processor configured to:

accumulate, for each user, satisfaction information that represents whether users who make requests are satisfied with responses received from service providing functions that generate the responses to the requests of the users, to the memory, the satisfaction information including identification information that indicates, among the service providing functions, a service providing function that generates the response satisfied by the user;

calculate, for each user, a degree of satisfaction for each of the service providing functions based on the satisfaction information accumulated in the memory;

identify, for each user, a service providing function that has the degree of satisfaction that meets a predetermined condition among the service providing functions;

determine, for each user, the identified service providing function as a preferential service providing function that is preferentially used at a time of generating a response to a request from each user;

determining, for each user, a ratio of a frequency of sorting requests to each of the service providing functions such that a ratio corresponding to the preferential service providing function is higher than a ratio corresponding to each of service providing functions other than the preferential service providing function;

sorting, for each user, a request to one of the service providing functions such that a frequency of requests sorted to each of the service providing functions follows the determined ratio; and outputting a response received from the one of the service providing functions as information to be presented to each user.

* * * * *